US008762492B2

(12) United States Patent
Boyer et al.

(10) Patent No.: US 8,762,492 B2
(45) Date of Patent: Jun. 24, 2014

(54) ELECTRONIC MAIL REMINDER FOR AN INTERNET TELEVISION PROGRAM GUIDE

(75) Inventors: Frankin E Boyer, Cleveland, OK (US); Timothy B Demers, Tulsa, OK (US); Bruce A Blackwell, Broken Arrow, OK (US)

(73) Assignee: United Video Properties, Inc., Santa Clara, CA (US)

( * ) Notice: Subject to any disclaimer, the term of this patent is extended or adjusted under 35 U.S.C. 154(b) by 1463 days.

(21) Appl. No.: 10/933,689

(22) Filed: Sep. 3, 2004

(65) Prior Publication Data

US 2005/0138660 A1 Jun. 23, 2005

Related U.S. Application Data

(63) Continuation of application No. 08/987,740, filed on Dec. 9, 1997, now abandoned, which is a continuation-in-part of application No. 08/938,028, filed on Sep. 18, 1997, now abandoned.

(51) Int. Cl.
*G06F 15/16* (2006.01)

(52) U.S. Cl.
USPC ........................................................ 709/218

(58) Field of Classification Search
USPC ........................................ 709/218, 206–207
See application file for complete search history.

(56) References Cited

U.S. PATENT DOCUMENTS

| | | | |
|---|---|---|---|
| 4,024,401 A | 5/1977 | Bernstein et al. | |
| 4,081,753 A | 3/1978 | Miller | |
| 4,170,782 A | 10/1979 | Miller | |
| 4,271,532 A | 6/1981 | Wine | |
| 4,280,148 A | 7/1981 | Saxena | |
| 4,300,040 A | 11/1981 | Gould et al. | |
| 4,367,559 A | 1/1983 | Tults | |
| 4,375,651 A | 3/1983 | Templin et al. | |
| 4,381,522 A | 4/1983 | Lambert | |

(Continued)

FOREIGN PATENT DOCUMENTS

| | | |
|---|---|---|
| CA | 2345161 | 6/1994 |
| CN | 1567986 | 1/2005 |

(Continued)

OTHER PUBLICATIONS

"Viewdata Service Terminal Specification," British Post Office, Issue 5, Aug. 1978.

(Continued)

*Primary Examiner* — Maceeh Anwari
(74) *Attorney, Agent, or Firm* — Ropes & Gray LLP

(57) ABSTRACT

An Internet television program guide electronic-mail (e-mail) reminder system is provided. The system allows a user at a multimedia system to order and receive e-mail message reminders of scheduled television events over the Internet. The user can order e-mail reminders after selecting a program from the program listings or by supplying [a program title directly] specific user program preferences without having to consult the program listings. The user can specify when and how often the reminders will be generated and received. If desired, the user can view a list of all currently requested e-mail reminders. Entries can be added to the list or the user can cancel a previously ordered reminder. The user can order e-mail reminders for scheduled pay-per-view programs using the system. The user can also have reminder information periodically updated and available directly on the user's multimedia system.

24 Claims, 16 Drawing Sheets

(56) References Cited

U.S. PATENT DOCUMENTS

| | | |
|---|---|---|
| 4,390,901 A | 6/1983 | Keiser |
| 4,425,579 A | 1/1984 | Merrell |
| 4,429,385 A | 1/1984 | Cichelli et al. |
| 4,495,654 A | 1/1985 | Deiss |
| 4,527,194 A | 7/1985 | Sirazi |
| 4,625,080 A | 11/1986 | Scott |
| 4,641,205 A | 2/1987 | Beyers, Jr. |
| 4,645,873 A | 2/1987 | Chomet |
| 4,689,022 A | 8/1987 | Peers et al. |
| 4,691,351 A | 9/1987 | Hayashi et al. |
| 4,706,121 A | 11/1987 | Young |
| 4,751,578 A | 6/1988 | Reiter et al. |
| 4,754,326 A | 6/1988 | Kram et al. |
| 4,761,684 A | 8/1988 | Clark et al. |
| 4,787,063 A | 11/1988 | Muguet |
| 4,882,732 A | 11/1989 | Kaminaga |
| 4,908,707 A | 3/1990 | Kinghorn |
| 4,908,713 A | 3/1990 | Levine |
| 4,959,719 A | 9/1990 | Strubbe et al. |
| 4,963,994 A | 10/1990 | Levine |
| 4,977,455 A | 12/1990 | Young |
| 5,016,273 A | 5/1991 | Hoff |
| 5,027,400 A | 6/1991 | Baji et al. |
| 5,036,314 A | 7/1991 | Barillari et al. |
| 5,038,211 A | 8/1991 | Hallenbeck |
| 5,047,867 A | 9/1991 | Strubbe et al. |
| 5,075,771 A | 12/1991 | Hashimoto |
| 5,089,885 A | 2/1992 | Clark |
| 5,090,049 A | 2/1992 | Chen |
| 5,113,259 A | 5/1992 | Romesburg et al. |
| 5,126,851 A | 6/1992 | Yoshimura et al. |
| 5,132,992 A | 7/1992 | Yurt et al. |
| 5,155,591 A | 10/1992 | Wachob |
| 5,170,388 A | 12/1992 | Endoh |
| 5,179,439 A | 1/1993 | Hashimoto et al. |
| 5,187,589 A | 2/1993 | Kono et al. |
| 5,189,630 A | 2/1993 | Barstow et al. |
| 5,191,423 A | 3/1993 | Yoshida et al. |
| 5,195,134 A | 3/1993 | Inoue et al. |
| 5,210,611 A | 5/1993 | Yee et al. |
| 5,223,924 A | 6/1993 | Strubbe |
| 5,231,494 A | 7/1993 | Wachob |
| 5,233,423 A | 8/1993 | Jernigan et al. |
| 5,253,066 A | 10/1993 | Vogel |
| 5,262,860 A | 11/1993 | Fitzpatrick et al. |
| 5,283,819 A | 2/1994 | Glick et al. |
| 5,296,931 A | 3/1994 | Na |
| 5,317,403 A | 5/1994 | Keenan |
| 5,323,240 A | 6/1994 | Amano et al. |
| 5,325,423 A | 6/1994 | Lewis |
| 5,335,277 A | 8/1994 | Harvey et al. |
| 5,347,632 A | 9/1994 | Filepp et al. |
| 5,353,121 A | 10/1994 | Young et al. |
| 5,359,367 A | 10/1994 | Stockill |
| 5,382,983 A | 1/1995 | Kwoh et al. |
| 5,396,546 A | 3/1995 | Remillard |
| 5,398,138 A | 3/1995 | Tomita |
| 5,410,326 A | 4/1995 | Goldstein |
| 5,410,344 A | 4/1995 | Graves et al. |
| 5,410,367 A | 4/1995 | Zahavi et al. |
| 5,412,720 A | 5/1995 | Hoarty |
| 5,414,756 A | 5/1995 | Levine |
| 5,432,561 A | 7/1995 | Strubbe |
| 5,444,499 A | 8/1995 | Saitoh |
| 5,446,919 A | 8/1995 | Wilkins |
| 5,455,570 A | 10/1995 | Cook et al. |
| 5,465,113 A | 11/1995 | Gilboy |
| 5,465,385 A | 11/1995 | Ohga et al. |
| 5,469,206 A | 11/1995 | Strubbe et al. |
| 5,475,835 A | 12/1995 | Hickey |
| 5,477,262 A | 12/1995 | Banker et al. |
| 5,479,266 A | 12/1995 | Young et al. |
| 5,479,268 A | 12/1995 | Young et al. |
| 5,481,296 A | 1/1996 | Cragun et al. |
| 5,483,278 A | 1/1996 | Strubbe et al. |
| 5,488,409 A | 1/1996 | Yuen et al. |
| 5,502,504 A | 3/1996 | Marshall et al. |
| 5,515,106 A | 5/1996 | Chaney et al. |
| 5,515,511 A | 5/1996 | Nguyen et al. |
| 5,517,254 A | 5/1996 | Monta et al. |
| 5,517,256 A | 5/1996 | Hashimoto |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,534,911 A | 7/1996 | Levitan |
| 5,544,321 A | 8/1996 | Theimer et al. |
| 5,548,506 A | 8/1996 | Srinivasan |
| 5,550,576 A | 8/1996 | Klosterman |
| 5,550,578 A | 8/1996 | Hoarty et al. |
| 5,550,863 A | 8/1996 | Yurt et al. |
| 5,553,221 A | 9/1996 | Reimer et al. |
| 5,559,548 A | 9/1996 | Davis et al. |
| 5,559,549 A | 9/1996 | Hendricks et al. |
| 5,559,550 A | 9/1996 | Mankovitz |
| 5,561,709 A | 10/1996 | Remillard |
| 5,563,665 A | 10/1996 | Chang |
| 5,570,295 A | 10/1996 | Isenberg et al. |
| 5,572,442 A | 11/1996 | Schulhof et al. |
| 5,576,755 A | 11/1996 | Davis et al. |
| 5,579,239 A | 11/1996 | Freeman et al. |
| 5,583,560 A | 12/1996 | Florin et al. |
| 5,585,838 A | 12/1996 | Lawler et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,490 A | 1/1997 | Dawson et al. |
| 5,594,509 A | 1/1997 | Florin et al. |
| 5,594,661 A | 1/1997 | Bruner et al. |
| 5,596,373 A | 1/1997 | White et al. |
| 5,596,705 A | 1/1997 | Reimer et al. |
| 5,600,364 A | 2/1997 | Hendricks et al. |
| 5,606,374 A | 2/1997 | Bertram |
| 5,616,876 A | 4/1997 | Cluts |
| 5,617,526 A | 4/1997 | Oran et al. |
| 5,617,565 A | 4/1997 | Augenbraun et al. |
| 5,619,249 A | 4/1997 | Billock et al. |
| 5,619,274 A | 4/1997 | Roop et al. |
| 5,621,456 A | 4/1997 | Florin et al. |
| 5,623,613 A | 4/1997 | Rowe et al. |
| 5,625,693 A | 4/1997 | Rohatgi et al. |
| 5,629,733 A | 5/1997 | Youman et al. |
| 5,630,119 A | 5/1997 | Aristides et al. |
| 5,631,995 A | 5/1997 | Weissensteiner et al. |
| 5,635,978 A | 6/1997 | Alten et al. |
| 5,635,979 A | 6/1997 | Kostreski et al. |
| 5,635,989 A | 6/1997 | Rothmuller |
| 5,640,484 A | 6/1997 | Mankovitz |
| 5,654,748 A | 8/1997 | Matthews, III |
| 5,657,072 A | 8/1997 | Aristides et al. |
| 5,659,742 A | 8/1997 | Beattie et al. |
| 5,663,757 A | 9/1997 | Morales |
| 5,666,293 A | 9/1997 | Metz et al. |
| 5,666,645 A | 9/1997 | Thomas et al. |
| 5,671,411 A | 9/1997 | Watts et al. |
| 5,675,390 A | 10/1997 | Schindler et al. |
| 5,677,708 A | 10/1997 | Matthews, III et al. |
| 5,677,981 A | 10/1997 | Kato et al. |
| 5,682,206 A | 10/1997 | Wehmeyer et al. |
| 5,682,525 A | 10/1997 | Bouve et al. |
| 5,684,525 A | 11/1997 | Klosterman |
| 5,686,954 A | 11/1997 | Yoshinobu et al. |
| 5,689,663 A | 11/1997 | Williams |
| 5,691,476 A | 11/1997 | Madaras |
| 5,692,214 A | 11/1997 | Levine |
| 5,694,163 A | 12/1997 | Harrison |
| 5,694,176 A | 12/1997 | Bruette et al. |
| 5,696,905 A | 12/1997 | Reimer et al. |
| 5,699,052 A | 12/1997 | Miyahara |
| 5,699,107 A | 12/1997 | Lawler et al. |
| 5,699,528 A | 12/1997 | Hogan |
| 5,708,767 A | 1/1998 | Yeo et al. |
| 5,708,780 A | 1/1998 | Levergood et al. |

(56) References Cited

U.S. PATENT DOCUMENTS

| | | |
|---|---|---|
| 5,710,601 A | 1/1998 | Marshall et al. |
| 5,710,884 A | 1/1998 | Dedrick |
| 5,717,923 A | 2/1998 | Dedrick |
| 5,721,827 A | 2/1998 | Logan et al. |
| 5,722,041 A | 2/1998 | Freadman |
| 5,724,103 A | 3/1998 | Batchelor |
| 5,724,567 A | 3/1998 | Rose et al. |
| 5,726,702 A | 3/1998 | Hamaguchi et al. |
| 5,731,844 A | 3/1998 | Rauch et al. |
| 5,734,853 A | 3/1998 | Hendricks et al. |
| 5,734,893 A | 3/1998 | Li et al. |
| 5,740,549 A | 4/1998 | Reilly et al. |
| 5,742,816 A | 4/1998 | Barr et al. |
| 5,745,710 A | 4/1998 | Clanton, III et al. |
| 5,748,191 A | 5/1998 | Rozak et al. |
| 5,748,716 A | 5/1998 | Levine |
| 5,749,081 A | 5/1998 | Whiteis |
| 5,751,282 A | 5/1998 | Girard et al. |
| 5,752,160 A | 5/1998 | Dunn |
| 5,754,939 A | 5/1998 | Herz et al. |
| 5,758,257 A | 5/1998 | Herz et al. |
| 5,758,259 A | 5/1998 | Lawler |
| 5,760,821 A | 6/1998 | Ellis et al. |
| 5,761,372 A | 6/1998 | Yoshinobu et al. |
| 5,761,602 A | 6/1998 | Wagner et al. |
| 5,761,606 A | 6/1998 | Wolzien |
| 5,768,528 A | 6/1998 | Stumm |
| 5,774,357 A | 6/1998 | Hoffberg et al. |
| 5,774,664 A | 6/1998 | Hidary et al. |
| 5,774,859 A | 6/1998 | Houser et al. |
| 5,778,181 A | 7/1998 | Hidary et al. |
| 5,781,246 A | 7/1998 | Alten et al. |
| 5,781,734 A | 7/1998 | Ohno et al. |
| 5,787,259 A | 7/1998 | Haroun et al. |
| 5,788,507 A | 8/1998 | Redford et al. |
| 5,790,201 A | 8/1998 | Antos |
| 5,790,202 A | 8/1998 | Kummer et al. |
| 5,790,753 A | 8/1998 | Krishnamoorthy et al. |
| 5,793,964 A | 8/1998 | Rogers et al. |
| 5,793,972 A | 8/1998 | Shane et al. |
| 5,798,785 A | 8/1998 | Hendricks et al. |
| 5,801,747 A | 9/1998 | Bedard |
| 5,805,763 A | 9/1998 | Lawler et al. |
| 5,805,806 A | 9/1998 | McArthur |
| 5,809,214 A | 9/1998 | Nureki et al. |
| 5,809,242 A | 9/1998 | Shaw et al. |
| 5,809,471 A | 9/1998 | Brodsky |
| 5,812,124 A | 9/1998 | Eick et al. |
| 5,812,931 A | 9/1998 | Yuen |
| 5,815,145 A | 9/1998 | Matthews, III |
| 5,818,441 A | 10/1998 | Throckmorton et al. |
| 5,818,511 A | 10/1998 | Farry et al. |
| 5,818,935 A | 10/1998 | Maa |
| 5,819,156 A | 10/1998 | Belmont |
| 5,819,285 A | 10/1998 | Damico et al. |
| 5,822,123 A | 10/1998 | Davis et al. |
| 5,828,419 A | 10/1998 | Bruette et al. |
| 5,828,420 A | 10/1998 | Marshall et al. |
| 5,828,839 A | 10/1998 | Moncreiff |
| 5,828,945 A | 10/1998 | Klosterman |
| 5,832,223 A | 11/1998 | Hara et al. |
| 5,833,468 A | 11/1998 | Guy et al. |
| 5,835,717 A | 11/1998 | Karlton et al. |
| 5,838,383 A | 11/1998 | Chimoto et al. |
| 5,844,552 A | 12/1998 | Gaughan et al. |
| 5,844,620 A | 12/1998 | Coleman et al. |
| 5,848,396 A | 12/1998 | Gerace |
| 5,850,218 A | 12/1998 | LaJoie et al. |
| 5,852,437 A | 12/1998 | Wugofski et al. |
| 5,861,881 A | 1/1999 | Freeman et al. |
| 5,861,906 A | 1/1999 | Dunn et al. |
| 5,862,292 A | 1/1999 | Kubota et al. |
| 5,867,226 A | 2/1999 | Wehmeyer et al. |
| 5,867,233 A | 2/1999 | Tanaka et al. |
| 5,870,754 A | 2/1999 | Dimitrova et al. |
| 5,873,660 A | 2/1999 | Walsh et al. |
| 5,875,108 A | 2/1999 | Hoffberg et al. |
| 5,877,906 A | 3/1999 | Nagasawa et al. |
| 5,880,720 A | 3/1999 | Iwafune et al. |
| 5,880,768 A | 3/1999 | Lemmons et al. |
| 5,886,732 A | 3/1999 | Humpleman |
| 5,889,950 A | 3/1999 | Kuzma |
| 5,892,536 A | 4/1999 | Logan et al. |
| 5,892,767 A | 4/1999 | Bell et al. |
| 5,900,867 A | 5/1999 | Schindler et al. |
| 5,903,545 A | 5/1999 | Sabourin et al. |
| 5,903,816 A | 5/1999 | Broadwin et al. |
| 5,905,865 A | 5/1999 | Palmer et al. |
| 5,907,322 A | 5/1999 | Kelly et al. |
| 5,907,323 A | 5/1999 | Lawler et al. |
| 5,912,664 A | 6/1999 | Eick et al. |
| 5,914,712 A | 6/1999 | Sartain et al. |
| 5,914,746 A | 6/1999 | Matthews, III et al. |
| 5,915,026 A | 6/1999 | Mankovitz |
| 5,915,250 A | 6/1999 | Jain et al. |
| 5,923,848 A * | 7/1999 | Goodhand et al. ............ 709/219 |
| 5,926,175 A | 7/1999 | Sturgeon et al. |
| 5,929,849 A | 7/1999 | Kikinis |
| 5,929,932 A | 7/1999 | Otsuki et al. |
| 5,931,905 A | 8/1999 | Hashimoto et al. |
| 5,931,908 A | 8/1999 | Gerba et al. |
| 5,937,160 A | 8/1999 | Davis et al. |
| 5,940,073 A | 8/1999 | Klosterman et al. |
| 5,944,786 A | 8/1999 | Quinn |
| 5,946,386 A | 8/1999 | Rogers et al. |
| 5,949,954 A | 9/1999 | Young et al. |
| 5,955,988 A | 9/1999 | Blonstein et al. |
| 5,956,716 A | 9/1999 | Kenner et al. |
| 5,973,683 A | 10/1999 | Cragun et al. |
| 5,977,964 A | 11/1999 | Williams et al. |
| 5,983,236 A | 11/1999 | Yager et al. |
| 5,988,078 A | 11/1999 | Levine |
| 5,990,927 A | 11/1999 | Hendricks et al. |
| 5,991,799 A | 11/1999 | Yen et al. |
| 6,002,394 A | 12/1999 | Schein et al. |
| 6,002,443 A | 12/1999 | Iggulden |
| 6,002,444 A | 12/1999 | Marshall et al. |
| 6,003,030 A | 12/1999 | Kenner et al. |
| 6,005,561 A | 12/1999 | Hawkins et al. |
| 6,005,563 A | 12/1999 | White et al. |
| 6,005,565 A | 12/1999 | Legall et al. |
| 6,005,597 A | 12/1999 | Barrett et al. |
| 6,006,257 A | 12/1999 | Slezak |
| 6,008,802 A | 12/1999 | Iki et al. |
| 6,008,803 A | 12/1999 | Rowe et al. |
| 6,012,086 A | 1/2000 | Lowell |
| 6,014,184 A | 1/2000 | Knee et al. |
| 6,016,141 A | 1/2000 | Knudson et al. |
| 6,018,372 A | 1/2000 | Etheredge |
| 6,020,883 A | 2/2000 | Herz et al. |
| 6,021,433 A | 2/2000 | Payne et al. |
| 6,023,267 A | 2/2000 | Chapuis et al. |
| 6,025,837 A | 2/2000 | Matthews, III et al. |
| 6,029,195 A | 2/2000 | Herz |
| 6,049,831 A | 4/2000 | Gardell et al. |
| 6,058,238 A | 5/2000 | Ng |
| 6,061,082 A | 5/2000 | Park |
| 6,065,047 A | 5/2000 | Carpenter et al. |
| 6,067,561 A | 5/2000 | Dillon |
| 6,072,460 A | 6/2000 | Marshall et al. |
| 6,073,168 A | 6/2000 | Mighdoll et al. |
| 6,075,526 A | 6/2000 | Rothmuller |
| 6,078,348 A | 6/2000 | Klosterman et al. |
| 6,081,750 A | 6/2000 | Hoffberg et al. |
| 6,088,722 A | 7/2000 | Herz et al. |
| 6,091,883 A | 7/2000 | Artigalas et al. |
| 6,097,441 A | 8/2000 | Allport |
| 6,098,065 A | 8/2000 | Skillen et al. |
| 6,104,334 A | 8/2000 | Allport |
| 6,104,390 A | 8/2000 | Sturgeon et al. |
| 6,104,705 A | 8/2000 | Ismail et al. |
| 6,125,230 A | 9/2000 | Yaginuma |
| 6,130,726 A | 10/2000 | Darbee et al. |
| 6,133,909 A | 10/2000 | Schein et al. |

(56) References Cited

U.S. PATENT DOCUMENTS

| | | | |
|---|---|---|---|
| 6,139,177 A | 10/2000 | Venkatraman et al. |
| 6,141,003 A | 10/2000 | Chor et al. |
| 6,151,643 A | 11/2000 | Cheng et al. |
| 6,157,411 A | 12/2000 | Williams et al. |
| 6,163,316 A | 12/2000 | Killian |
| 6,163,345 A | 12/2000 | Noguchi et al. |
| 6,163,795 A | 12/2000 | Kikinis |
| 6,172,674 B1 | 1/2001 | Etheredge |
| 6,172,677 B1 | 1/2001 | Stautner et al. |
| 6,177,931 B1 | 1/2001 | Alexander et al. |
| 6,181,335 B1 | 1/2001 | Hendricks et al. |
| 6,184,877 B1 | 2/2001 | Dodson et al. |
| 6,208,384 B1 | 3/2001 | Schultheiss |
| 6,212,553 B1 | 4/2001 | Lee et al. |
| 6,216,264 B1 | 4/2001 | Maze et al. |
| 6,233,734 B1 | 5/2001 | Macrae et al. |
| 6,237,049 B1 | 5/2001 | Ludtke |
| 6,240,555 B1 | 5/2001 | Shoff et al. |
| 6,262,722 B1 | 7/2001 | Allison et al. |
| 6,263,501 B1 | 7/2001 | Schein et al. |
| 6,266,814 B1 | 7/2001 | Lemmons et al. |
| 6,268,849 B1 | 7/2001 | Boyer et al. |
| 6,310,886 B1 | 10/2001 | Barton |
| 6,317,885 B1* | 11/2001 | Fries ........................... 725/109 |
| 6,324,338 B1 | 11/2001 | Wood et al. |
| 6,327,049 B1 | 12/2001 | Ohtsuka |
| 6,331,877 B1 | 12/2001 | Bennington et al. |
| 6,335,963 B1 | 1/2002 | Bosco |
| 6,341,374 B2 | 1/2002 | Schein et al. |
| 6,357,043 B1 | 3/2002 | Ellis et al. |
| 6,359,636 B1 | 3/2002 | Schindler et al. |
| 6,373,528 B1 | 4/2002 | Bennington et al. |
| 6,388,714 B1 | 5/2002 | Schein et al. |
| 6,396,546 B1 | 5/2002 | Alten et al. |
| 6,408,437 B1 | 6/2002 | Hendricks et al. |
| 6,411,696 B1* | 6/2002 | Iverson et al. ........... 379/201.06 |
| 6,437,836 B1 | 8/2002 | Huang et al. |
| 6,463,585 B1 | 10/2002 | Hendricks et al. |
| 6,505,348 B1 | 1/2003 | Knowles et al. |
| 6,509,908 B1 | 1/2003 | Croy et al. |
| 6,516,467 B1 | 2/2003 | Schindler et al. |
| 6,526,577 B1 | 2/2003 | Knudson et al. |
| 6,545,722 B1 | 4/2003 | Schultheiss et al. |
| 6,546,399 B1 | 4/2003 | Reed et al. |
| 6,564,378 B1 | 5/2003 | Satterfield et al. |
| 6,591,245 B1 | 7/2003 | Klug |
| 6,611,654 B1 | 8/2003 | Shteyn |
| 6,661,468 B2 | 12/2003 | Alten et al. |
| 6,675,385 B1 | 1/2004 | Wang |
| 6,675,386 B1 | 1/2004 | Hendricks et al. |
| 6,696,373 B2 | 2/2004 | Kinn et al. |
| 6,732,369 B1 | 5/2004 | Schein et al. |
| 6,742,183 B1 | 5/2004 | Reynolds et al. |
| 6,754,904 B1 | 6/2004 | Cooper et al. |
| 6,760,537 B2 | 7/2004 | Mankovitz |
| 6,783,563 B1 | 8/2004 | Eckhoff et al. |
| 6,828,993 B1 | 12/2004 | Hendricks et al. |
| 6,865,746 B1 | 3/2005 | Herrington et al. |
| 6,898,762 B2 | 5/2005 | Ellis et al. |
| 6,925,567 B1 | 8/2005 | Hirata et al. |
| 6,983,483 B2 | 1/2006 | Maze et al. |
| 7,013,478 B1 | 3/2006 | Hendricks et al. |
| 7,050,988 B2 | 5/2006 | Atcheson et al. |
| 7,058,635 B1 | 6/2006 | Shah-Nazaroff et al. |
| 7,165,098 B1 | 1/2007 | Boyer et al. |
| 7,185,355 B1 | 2/2007 | Ellis et al. |
| 7,187,847 B2 | 3/2007 | Young et al. |
| 7,328,450 B2 | 2/2008 | Macrae et al. |
| 7,349,976 B1 | 3/2008 | Glaser et al. |
| 7,363,645 B1 | 4/2008 | Hendricks |
| 7,437,751 B2 | 10/2008 | Daniels |
| 7,480,929 B2 | 1/2009 | Klosterman et al. |
| 7,493,641 B2 | 2/2009 | Klosterman et al. |
| 7,540,010 B2 | 5/2009 | Hanaya et al. |
| 7,665,109 B2 | 2/2010 | Matthews, III et al. |
| 7,721,307 B2 | 5/2010 | Hendricks et al. |
| 7,757,254 B2 | 7/2010 | Shoff et al. |
| 8,078,751 B2 | 12/2011 | Janik et al. |
| 8,112,776 B2 | 2/2012 | Schein et al. |
| 2002/0026496 A1 | 2/2002 | Boyer et al. |
| 2002/0032907 A1 | 3/2002 | Daniels |
| 2002/0059599 A1 | 5/2002 | Schein et al. |
| 2002/0112249 A1 | 8/2002 | Hendricks et al. |
| 2002/0138840 A1 | 9/2002 | Schein et al. |
| 2003/0005445 A1 | 1/2003 | Schein et al. |
| 2003/0031465 A1 | 2/2003 | Blake |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0208756 A1 | 11/2003 | Macrae et al. |
| 2003/0208758 A1 | 11/2003 | Schein et al. |
| 2004/0078815 A1 | 4/2004 | Lemmons et al. |
| 2004/0103439 A1 | 5/2004 | Macrae et al. |
| 2004/0139465 A1 | 7/2004 | Matthews et al. |
| 2004/0210935 A1 | 10/2004 | Schein et al. |
| 2004/0221310 A1 | 11/2004 | Herrington et al. |
| 2005/0015815 A1 | 1/2005 | Shoff et al. |
| 2005/0138660 A1 | 6/2005 | Boyer et al. |
| 2005/0204388 A1 | 9/2005 | Knudson et al. |
| 2005/0229215 A1 | 10/2005 | Schein et al. |
| 2005/0235320 A1 | 10/2005 | Maze et al. |
| 2005/0267819 A1 | 12/2005 | Kaplan |
| 2005/0278741 A1 | 12/2005 | Robarts et al. |
| 2005/0283800 A1 | 12/2005 | Ellis et al. |
| 2006/0037044 A1 | 2/2006 | Daniels |
| 2007/0271582 A1 | 11/2007 | Ellis et al. |
| 2008/0178221 A1 | 7/2008 | Schein et al. |
| 2008/0184308 A1 | 7/2008 | Herrington et al. |
| 2008/0184315 A1 | 7/2008 | Ellis et al. |
| 2008/0184319 A1 | 7/2008 | Mankovitz |
| 2008/0235725 A1 | 9/2008 | Hendricks |
| 2008/0288980 A1 | 11/2008 | Schein et al. |
| 2009/0070817 A1 | 3/2009 | Ellis et al. |
| 2009/0077589 A1 | 3/2009 | Boyer et al. |
| 2010/0115413 A1 | 5/2010 | Schein et al. |
| 2010/0115541 A1 | 5/2010 | Schein et al. |
| 2010/0211969 A1 | 8/2010 | Schein et al. |
| 2010/0211975 A1 | 8/2010 | Boyer et al. |
| 2011/0173660 A1 | 7/2011 | Schein et al. |
| 2011/0258663 A1 | 10/2011 | Lemmons et al. |
| 2012/0272270 A1 | 10/2012 | Boyer et al. |

FOREIGN PATENT DOCUMENTS

| | | |
|---|---|---|
| DE | 31 51 492 | 7/1983 |
| DE | 36 40 436 | 6/1988 |
| DE | 42 01 031 | 7/1993 |
| DE | 42 17 246 | 12/1993 |
| DE | 42 40 187 | 6/1994 |
| DE | 44 07 701 | 9/1995 |
| DE | 44 40 419 | 5/1996 |
| DE | 19 531 121 | 2/1997 |
| DE | 19 740 079 | 3/1999 |
| EP | 0 276 425 | 8/1988 |
| EP | 0 339 675 | 11/1989 |
| EP | 0 463 451 | 1/1992 |
| EP | 0 617 563 | 9/1994 |
| EP | 0 624 040 | 11/1994 |
| EP | 0 644 689 | 3/1995 |
| EP | 0 650 114 | 4/1995 |
| EP | 0 658 048 | 6/1995 |
| EP | 0 682 452 | 11/1995 |
| EP | 0 705 036 | 4/1996 |
| EP | 0 721 253 | 7/1996 |
| EP | 0 721 253 A2 | 7/1996 |
| EP | 0723369 A1 | 7/1996 |
| EP | 0 725 539 | 8/1996 |
| EP | 0 742 669 | 11/1996 |
| EP | 0 774 853 | 5/1997 |
| EP | 0 774 866 | 5/1997 |
| EP | 0 793 225 | 9/1997 |

(56) References Cited

FOREIGN PATENT DOCUMENTS

| | | |
|---|---|---|
| EP | 0 805 594 | 11/1997 |
| EP | 0 837 599 | 4/1998 |
| EP | 0 852 361 | 7/1998 |
| EP | 0 854 645 | 7/1998 |
| GB | 1 554 411 | 10/1979 |
| GB | 2 265 792 | 10/1993 |
| GB | 2 325 537 | 11/1998 |
| JP | 62-060372 | 3/1987 |
| JP | 63-092177 | 4/1988 |
| JP | 10-042235 | 2/1989 |
| JP | 03-022770 | 1/1991 |
| JP | 04-079053 | 3/1992 |
| JP | 04-227380 | 8/1992 |
| JP | 05-260400 | 10/1993 |
| JP | 05-314186 | 11/1993 |
| JP | 06-021907 | 1/1994 |
| JP | 06-038165 | 2/1994 |
| JP | 06-124309 | 5/1994 |
| JP | 06-504165 | 5/1994 |
| JP | 06-217271 | 8/1994 |
| JP | 06-243539 | 9/1994 |
| JP | 06-350546 | 12/1994 |
| JP | 07-021619 | 1/1995 |
| JP | 07-123326 | 5/1995 |
| JP | 07-135621 | 5/1995 |
| JP | 07-147657 | 6/1995 |
| JP | 07-154349 | 6/1995 |
| JP | 07-160732 | 6/1995 |
| JP | 07-162776 | 6/1995 |
| JP | 07-184131 | 7/1995 |
| JP | 07-193762 | 7/1995 |
| JP | 07-193763 | 7/1995 |
| JP | 07-212732 | 8/1995 |
| JP | 07-020254 | 11/1995 |
| JP | 08-032528 | 2/1996 |
| JP | 08-032538 | 2/1996 |
| JP | 08-056352 | 2/1996 |
| JP | 08-125497 | 5/1996 |
| JP | 08-506941 | 7/1996 |
| JP | 08-251122 | 9/1996 |
| JP | 08-275077 | 10/1996 |
| JP | 09-009245 | 1/1997 |
| JP | 09-102827 | 4/1997 |
| JP | 09-162821 | 6/1997 |
| JP | 10-093933 | 4/1998 |
| WO | WO 86/01359 | 2/1986 |
| WO | WO 87/03766 | 6/1987 |
| WO | WO 89/03085 | 4/1989 |
| WO | WO 94/13107 | 6/1994 |
| WO | WO 94/14282 | 6/1994 |
| WO | WO 94/14284 | 6/1994 |
| WO | WO 95/10910 | 4/1995 |
| WO | WO 95/15657 | 6/1995 |
| WO | WO 95/15658 | 6/1995 |
| WO | WO 95/19092 | 7/1995 |
| WO | WO 95/26095 | 9/1995 |
| WO | WO 95/26608 | 10/1995 |
| WO | WO 95/28799 | 10/1995 |
| WO | WO 95/32583 | 11/1995 |
| WO | WO 95/32585 | 11/1995 |
| WO | WO 96/13013 | 5/1996 |
| WO | WO 96/21990 | 7/1996 |
| WO | WO 96/24213 | 8/1996 |
| WO | WO 96/27989 | 9/1996 |
| WO | WO 96/34491 | 10/1996 |
| WO | WO 96/37983 | 11/1996 |
| WO | WO 96/37996 | 11/1996 |
| WO | WO 96/38962 | 12/1996 |
| WO | WO 97/02701 | 1/1997 |
| WO | WO 97/13368 | 4/1997 |
| WO | WO 97/31480 | 8/1997 |
| WO | WO 97/36422 | 10/1997 |
| WO | WO 97/45786 | 12/1997 |
| WO | WO 97/47106 | 12/1997 |
| WO | WO 97/47143 | 12/1997 |
| WO | WO 98/16062 | 4/1998 |
| WO | WO 98/17063 | 4/1998 |
| WO | WO 98/17064 | 4/1998 |
| WO | WO 98/21664 | 5/1998 |
| WO | WO 98/21877 | 5/1998 |
| WO | WO 98/43183 | 10/1998 |
| WO | WO 98/56173 | 12/1998 |
| WO | WO 98/56176 | 12/1998 |
| WO | WO 99/01984 | 1/1999 |
| WO | WO 99/04570 | 1/1999 |
| WO | WO 2005/027512 | 3/2005 |

OTHER PUBLICATIONS

"Viewdata and its potential impact on the USA: Final Report/vol. 1, The UK Experience," Link and Butler Cox & Partners Limited, Oct. 1978.

"Set-Top Box Control Software: A Key Component In Digital Video," in *Philips Journal of Research*, Raht et al. (1996).

"UVSG Teams With Microsoft on Internet Information Server," press release of United Video Satellite Group (Feb. 22, 1996).

"UVSG Offers System-Specific Web Site Development fo OPS," press release of United Video Satellite Group (Apr. 12, 1996).

The clickTV television program guide of TVData of Queensbury, New York. This website is located at www.clicktv.com (as printed from the Internet on Aug. 13, 1997).

The television program guide of Gist Communications, Inc. of New York, New York. This website is located at www.gist.com (as printed from the Internet on Aug. 14, 1997).

The television program guide website of TV Guide Entertainment Network. This website is located at www.tvguide.com (as printed from the Internet on Aug. 14-27, 1997).

The InfoBeat program guide website of InfoBeat, Inc. This website is located at www.infobeat.com (as printed from the Internet on Dec. 8, 1997).

"College Journalists Launch Daily Online Newsmagazine," Stewart Ugelow, from the internet at http://www.ugelow.com/1995/12/07/launch, Dec. 7, 1995.

"Student.Net TV Search & Remind," from the internet at http://web.archive.org/web/19970124213237/http://www.student.net/tv/ and http://web.archive.org/web/19970124214926/www.student.net/tv/serch.cgi?searchTerm=Fri . . . , printed on May 12, 2005.

"Does NBC Get It?," retrieved from the internet at http://www.open4success.org/db/bin19/019687.html, Aug. 14, 1995, printed on Dec. 11, 2013.

"Today's Stop: What's On Tonite," retrieved from the internet at http://internettourbus.com/arch/1995/TB100395.TXT, Oct. 3, 1995, printed on Dec. 9, 2013.

"What's On Tonite!," retrieved from the internet at http://www.library.georgetown.edu/newjour/publication/whats-tonite-tm, Jan. 28, 1995, printed on Dec. 11, 2013.

"A Financial Times Survey: Viewdata (Advertisement)," Financial Times, Mar. 20, 1979.

"A Wonderworld of Services," The Sunday Times, Innovation section, p. 4, Jan. 7, 1996.

"Columbia House CD-ROM Direct: Detail Page," accessed from the internet at http://web.archive.org/web/19961221160255/http://www.columbiahouse.com/cd/cgis . . . , copyright 1996, printed on Sep. 19, 2013.

"Columbia House CD-ROM Direct: Download Demos!," accessed from the internet at http://web.archive.org/web/19961221095819/http://www.columbiahouse.com/cd/cgis . . . , copyright 1996, printed on Sep. 19, 2013.

"Columbia House CD-ROM Direct: Member Center," accessed from the internet at http://web.archive.org/web/19961221085905/http://www.columbiahouse.com/repl/cd/ . . . , copyright 1996, printed on Sep. 19, 2013.

"Columbia House CD-ROM Direct: Member Center," copyright 1996.

"Columbia House CD-ROM Direct: The Connection," accessed from the internet at http://web.archive.org/web/19961221100721/http://www.columbiahouse.com/repl/cd/ . . . , copyright 1996, printed on Sep. 20, 2013.

(56) References Cited

OTHER PUBLICATIONS

"Columbia House CD-ROM Direct: The Connection," accessed from the internet at http://web.archive.org/web/19961223152924/http://www.columbiahouse.com/repl/cd/ . . . , copyright 1996, printed on Sep. 20, 2013.
"Columbia House Laser Disc Club: FAQ Answers," accessed from the internet at http://web.archive.org/web/19961223165516/http://www.columbiahouse.com/repl/lc/t . . . , copyright 1996, printed on Sep. 20, 2013.
"Columbia House Laser Disc Club: Join The Club," accessed from the internet at http://web.archive.org/web/19961221094037/http://www.columbiahouse.com/repl/lc/t . . . , copyright 1996, printed on Sep. 20, 2013.
"Columbia House Music Club: Join The Club," accessed from the internet at http://web.archive.org/web/19961221091101/http://www.columbiahouse.com/repl/mc . . . , copyright 1996, printed on Sep. 20, 2013.
"Columbia House Music Club: Search," accessed from the internet at http://web.archive.org/web/19961221114653/http://www.columbiahouse.com/repl/mc . . . , copyright 1996, printed on Sep. 19, 2013.
"Columbia House Music Club: Shopping Cart," accessed from the internet at http://web.archive.org/web/19961221120941/http://www.columbiahouse.com/ mc/cgis . . . , copyright 1996, printed on Sep. 19, 2013.
"Columbia House Video Club: Essential Collection," accessed from the internet at http://web.archive.org/web/199612211131908/http://www.columbiahouse.com/vc/cgis/j . . . , copyright 1996, printed on Sep. 20, 2013.
"GameSpot: Allied General at a Glance," accessed from the internet at http://web.archive.org/web/19970205153530/http://www.gamespot.com/strategy/allie . . . , copyright 1996, printed on Sep. 19, 2013.
"GameSpot: Allied General—Download It Now!!!!," accessed from the internet at http://web.archive.org/web/19970206133452/http://www.gamespot.com/strategy/allie . . . , copyright 1997, printed on Sep. 19, 2013.
"GameSpot's Downloads for Allied General," accessed from the internet at http://web.archive.org/web/19970205060703/http://www.gamespot.com/strategy/allie . . . , copyright 1997, printed on Sep. 19, 2013.
"Gateway Destination: The PC for the Office and the Family Room," PC Magazine, First Looks section, pp. 39-41, Jun. 11, 1996.
"Neue, Digitale Strategien—Bericht Von Den 5. Dermastaedter Fernsehtagen," FKT Fernseh Und Kinotechnik, vol. 49, No. 3, Mar. 1, 1995, pp. 135-139, XP000507348, Fachverlag Schiele & Schon GmbH., Berlin, DE, ISSN: 1430-9947.
"Reaching your subscribers is a complex and costly process-until now," from the Internet at http://www.evolveproducts.com/info.html, printed on Dec. 28, 1998.
"Step Up to the Superhighway," The Sunday Times, Innovation section, p. 6, Jan. 7, 1996.
"Teletext presents the alternative view," Financial Times, Oct. 24, 1977.
"The Columbia House Video Club: Download Software," accessed from the internet at http://web.archive.org/web/19961223163101/http://www.columbiahouse.com/repl/vc . . . , copyright 1996, printed on Sep. 19, 2013.
"Welcome to Columbia House Online," accessed from the internet at http://web.archive.org/web/19961221085121/http://www.columbiahouse.com/, copyright 1996, printed on Sep. 19, 2013.
"Yearling's Free Personalised TV Guide," from the internet at http://www.yearling.com/, Dec. 30, 1996.
ACM Multimedia 93 Proceedings, "A Digital On-Demand Video Service Supporting Content—Based Queries," Little et al. pp. 427-436, Jul. 1993.
Armstrong, L., "Channel-Surfing's next wave: Henry Yuen's interactive TV guide takes on TCI and Viacom," BusinessWeek, Jul. 31, 1995.
Arnold, W.F., "Britain to get wired city—via telephone," Electronics, Mar. 4, 1976, at p. 76.
Berniker, "TV Guide going online," Broadcasting & Cable, pp. 49-52, Jun. 13, 1994.
Blahut et al., "Interactive Television," Proceedings of the IEEE, Jul. 1995.
Boyd-Merritt, R., "Television wires two-way video," Electronic Engineering Times, Apr. 25, 1994.
Brugliera, "Digital On-Screen Display—A New Technology for the Consumer Interface," *Symposium Record Cable Sessions*, 18th International Television Symposium and Technical Exhibition, Montreux, Switzerland, Jun. 10-15, 1993, pp. 572-586, Jun. 11, 1993.
Buchholz et al., "Revolution auf dem Bildschirm—Die neuen Medien Videotext and Bildschirmtext," Wilhelm Goldmann Verlag, Munich, Germany, copyright 1979, pp. 24-33 and 36-39.
Compton et al., "Internet CNN NEWSROOM: a digital video news magazine and library," Proc. Of the Intl. Conf. on Multimedia Computing and Systems. Washington, May 15-18, 1995; [Proceedings of the International Conference on Multimedia Computing and Systems], Los Alamitos, IEEE Comp. Soc. Press, US, May 15, 1995, pp. 296-301, XP010154611.
Day, R., "The Great PC/TV Debate," OEM Magazine, Jul. 1, 1996.
December, "Presenting Java," Sams.net Publishing, published Sep. 20, 1995.
Defence and Counterclaim of the First and Second Defendants, No. HC11 C04556, between Starsight Telecast and United Video Properties (Claimants) and Virgin Media, Virgin Media Payments, and TiVo Defendants, pp. 10-11, Mar. 14, 2012.
Dial M for Movie, Funkschau Nov. 1994, Perspektiven, Video on Demand, pp. 78-79. (English language translation attached.).
Dialing the printed page, ITT in Europe Profile, 11/Spring 1977.
DIRECTV Plus2 System, Thompson Consumer Electronics, Inc., 1999.
DiRosa, S., "BIGSURF Netguide," Jul. 1995, vol. 3.1 (Sections 18, 21, and 28—renumbered as pp. 1-27).
Draft Grounds of Invalidity for EP (UK) 0 880 856 (Trial B), No. HC11 C04556, between Starsight Telecast and United Video Properties (Claimants) and Virgin Media, Virgin Media Payments, and TiVo (Defendants), 7 pgs., Oct. 2013.
Eckhoff, "TV Listing Star on the Computer," Central Penn Business Journal, High Beam Research, Mar. 15, 1996.
Eitz, Gerhard, "Zukünftige Informations—Und Datenangebote Beim Digitalen Fernsehen—EPG Und "Lesezeichen"," Rundfunktechnische Mitteilungen, vol. 41, pp. 67-72, Jun. 1997. (English language translation attached.).
Electronic Program Guide via Internet, Research Disclosure, 276, Kenneth Mason Publications, Hampshire, GB, vol. 385, No. 2, May 1, 1996, ISSN: 0374-4353.
Growing U.S. interest in the impact of viewdata, Computing Weekly, Jul. 20, 1978.
Hauptmann et al., "News on Demand," News-on-Demand: An Application of Informedia® Technology D-Lib Magazine, Sep. 13, 1995, XP002675162, Retrieved from the Internet: URL:http://www.dlib.org/dlib/september95/nod/page3.html [retrieved on May 2, 2012].
Hobbes Internet Timeline, Mar. 22, 2007.
Holland, G. L., "NAPLPS standard defines graphics and text communications," EDN, Jan. 10, 1985, at p. 179.
Honey, is there anything good on the remote tonight?, advertisement from Multichannel News, Broadband Week Section, p. 168, Nov. 30, 1998.
How Evolve Works, from the Internet at http://www.evolveproducts.com/network.html, printed on Dec. 28, 1998.
Iizuka et al., "The Overview of Internet TV Guide Japan—1 and 2," the 53rd National Conference Proceedings, Japan, Information Processing Society of Japan, Sep. 6, 1996 p. 3-227 to 230.
Instruction Manual Using StarSight 2, StarSight Telecast, Inc., 1994.
Kai et al., "Development of a Simulation System for Integrated Services Television," Report from Information Processing Society of Japan, Japan, Sep. 13, 1996, vol. 96, No. 90 p. 13-20. (Partial English language translation attached.).

(56) References Cited

OTHER PUBLICATIONS

Karunanithi, et al., "A Feature-Based Neural Network Movie Selection Approach," Proc. Intl. Workshop on Applications of Neural Networks to Telecommunications, Stockholm, Sweden, May 22-24, 1995, pp. 162-169.
Katkere et al., "Interactive Video on WWW: Beyond VCR-like Interfaces," Computer Networks and ISDN Systems, vol. 28, Issue 11, 1996, pp. 1559-1572.
Keith Lynch's timeline of net related terms and concepts, Mar. 22, 2007.
Khoo et al., "An Expert System Approach to Online Catalog Subject Searching," Information Processing & Management: An International Journal, vol. 30, No. 2, 1994, pp. 223-238.
Large, P., "Throw away the books—Viewdata's coming," Guardian, Jan. 10, 1978.
Large, P., "Viewdata, the invention that brings boundless advice and information to the home, also sets a test for the Post Office," Financial Guardian, Jun. 29, 1978.
Leftwich et al., *StarSight Interactive Television Program Guide, Phase III*, Functional/Interactional Architecture Specification Document, Orbit Interaction, Palo Alto, California ,undated.
Leftwich et al., *StarSight Interactive Television Program Guide, Phase IV*, Functional/Interactional Architecture Specification Document, Orbit Interaction, Palo Alto, California, published before Apr. 19, 1995.
Lists> What's on Tonite TV Listings Internet Artical, [Online], Jan. 28, 1995, XP002378869 Retrieved from the Internet: URL:www.scout.wisc.edu/Projects/PastProjects/NH/95-01-31/0018.html> [retrieved on Apr. 28, 2006] *the whole document*.
Lloyd, J., "Impact of Technology," Financial Times, Jul. 1978.
Melton, "The Uniden Super 4800," OnSat magazine, Jun. 10-16, 1990, pp. 2-4.
Microsoft Computer Dictionary, 3rd Edition, Copyright 1997, Exhibit 1036, definitions on pp. 194, 199, and 430.
Miller, M.D., "A Scenario for the Deployment of Interactive Multimedia Cable Television Systems in the United States in the 1990s," IEEE, 1994.
Money, S.A., "Teletext and Viewdata," Butterworth & Co. Ltd., London, 1979.
Mosley, J.D., "NAPLPS chip sets, though scarce, satisfy limited US videotex demand," EDN, Mar. 21, 1985, at p. 57.
Neumann, Andreas, "WDR Online Aufbau Und Perspektiven Automatisierter Online-Dienste Im WDR," Rundfunktechnische Mitteilungen, vol. 41, pp. 56- 66, Jun. 1997. (English language translation attached.).
Open TV fur interaktives Fernsehen, Trend & Technik, 9-95 RFE, p. 100. (English language translation attached.).
Owen, K., "How dial-a-fact is coming closer to home," The Times, Sep. 30, 1977.
Owen, K., "Why the Post Office is so excited by its plans for a TV screen information service," The Times, Sep. 26, 1976.
Personal Entertainment Guide—User's Guide, Version 1.0, Copyright 1991 by Lookahead Communications Inc.
Poole, J., "Demand for Viewdata Grows," Sunday Times, Feb. 10, 1977.
Printout from Google News Archives, Mar. 22, 2007.
Prodigy Launches Interactive TV Listing, Public Broadcasting Report, Apr. 22, 1994.
Qayyum, H., "Using IVDS and VBI for Interactive Television," IEEE, Jun. 10, 1996.
Rajapakshe et al., "Video on demand," (last modified Jun. 1995) <http://www-dse.doc.ic.ac.uk/~nd/suprise_95 /Journal/vol4/shr/report.html>.
RFC 822, Standard for the format of ARPA Internet Text Messages, Aug. 13, 1982.
Rogers, C., "Telcos vs. Cable TV: The Global View With Markets Converging and Regulatory Barriers Falling, Service Carriers Are Ready to Rumble," Data Communications, vol. 24, No. 13, pp. 75, 76, 78, and 80, Sep. 21, 1995.
Rosch, Gary D., "New data and information system set for commercial market trial," Telephony, Mar. 20, 1978, at p. 96.
Ruffler et al., "InfoRadio on Demand, WebTV and digiTaz—Telecommerce Case Studies," May 23, 1996.
Ryan, K., "Free Interactive TV Guide," Google Newsgroup, Alleged Date Sep. 29, 1995.
Ryan, M., "Interactive TV Takes a Corporate Twist," Electronic Engineering Times, Jul. 10, 1995.
Schauer, Tom: (No Subject), Internet Article, [Online] Sep. 28, 1995, XP002378870, Retrieved from the Internet: URL:www.vision2020.moscow.com/Archives/1995/9509/0058.htlm> [retrieved on Apr. 28, 2006] *the whole document*.
Schmuckler, Eric, "A marriage that's made in cyberspace (television networks pursue links with online information services)," May 16, 1994, Mediaweek, vol. 4, No. 20, p. 22 (3).
Selected pages from the "BBC Online—Schedules" web page. This web page is located at http://www.bbc.co.uk/schedules/ (as printed from the Internet on Oct. 19, 1999 and being dated as early as May 24, 1997).
Sharpless et al., "An advanced home terminal for interactive data communication," Conf. Rec. Int. Conf. Commun. ICC '77, IEEE, Jun. 12-15, 1977, at p. 19.6-47.
St. John, Sandringham, "Dress rehearsal for the PRESTEL show," New Scientist, Jun. 1, 1978, pp. 586-588.
Statement in an Examination Report dated Aug. 2, 1999 for a counterpart foreign application filed in New Zealand in which the foreign Examiner alleges that he has used "The Internet to access television listings for BBC World television as far back as mid-1996 . . . ".
Stickland, D.C., "It's a common noun," The Economist, Jun. 5, 1978.
Stokes, A., "The viewdata age: Power to the People," Computing Weekly, Jan. 1979.
Sun's Next Steps in Digital Set-Tops, article in Cablevision, p. 56, Nov. 16, 1998.
SuperGuide/Uniden 4800, "A Quick Guide to Programming the Uniden 4800—Dealer Set-Up Manual," undated, 8 pages.
SuperGuide/Uniden 4800, "A Users Guide to SuperGuide's™ Features," undated, 12 pages.
The Evolve EZ Guide. The Remote Control, from the Internet at http://www.evolveproducts.com/display2.html, printed on Dec. 28, 1998.
Three men on a Viewdata bike, The Economist, Mar. 25, 1978.
TV Guide movie database Internet web pages printed on Aug. 12, 1999, 9 pages.
TV Guide Online Set for Fall, Entertainment Marketing Letter, Aug. 1994.
Uniden®, UST-4800 Super, Integrated Receiver/Descrambler, Preliminary Reference Manual, Nov. 12, 1991, 80 pages.
Uniden®, UST-4800, Integrated Receiver/Descrambler, Installation Guide, copyright 1990, 60 pages.
Uniden®, UST-4800, Integrated Receiver/Descrambler, Operating Guide, copyright 1990, 24 pages.
VideoGuide, Videoguide User's Manual, pp. 1-27, undated.
Viewdata moves in U.S. but GEC may lose out, Computing Weekly, Jan. 25, 1978.
Waldo, Jim, "JiniTM Architecture Overview," from the Internet at http://Java.sun.com/products/jini/whitepapers/architectureoverview.pdf/printed on Jan. 25, 1999. The document bears a copyright date of 1998.
Web TV and Its Consumer Electronics Licensees Debut First Internet Television Network and Set-Top Box, Jul. 10, 1996 <http://www.ohlfs.com/keith/self/webtv/home/HTML/home.license.html>.
Whale, "Identification of Program Similarity in Large Populations," The Computer Journal, vol. 33, No. 2, 1990, pp. 140-146.
What is Jini?, from the Internet at http://java.sun.com/products/jini/whitepapers/whatsjini.pdf, printed on Jan. 25, 1999.
Whitehorn, K., "Viewdata and you," Observer, Jul. 30, 1978.
Why Jini Now?, from the internet at http://java.sun.com/products/jini/whitepapers/whyjininow.pdf, printed on Jan. 25, 1999. The document bears a copyright date of 1998.
Wikipedia article on CompuServe, Mar. 22, 2007.
Williams, David M., and Perry, Burt, "Rich Online Services as the Archetype for Interactive TV," Cable '94, Proceedings from Twelve Technical Sessions, 43rd Annual Convention

(56) References Cited

OTHER PUBLICATIONS and Exposition of the National Cable Television Association, May 22-25, 1994, New Orleans, LA., Technical Paper Compiled by Katherine Rutkowski, National Cable, XP008161201, pp. 21-35.

Wittig, H. et al., "Intelligent Media Agents in Interactive Television Systems," Proceedings of the International Conference on Multimedia Computing and Systems, Los Alamitos, CA, US, May 15, 1995, pp. 182-189, XP000603484.

Yoshida, J., "Interactive TV a Blur," Electronic Engineering Times, Jan. 30, 1995.

* cited by examiner

ENTER NAME:
ENTER E-MAIL ADDRESS:
ADDRESS 2:

— 414
— 418
— 421

— 413

REMIND ME:
○ THIS TIME ONLY.
○ EACH TIME THIS WEEK.
○ EACH TIME THIS MONTH.
○ OTHER

— 424

HOW SOON BEFORE EVENT DO YOU WANT TO BE REMINDED?
○ 1 HOUR
○ 1 DAY
○ 2 DAYS
○ OTHER

440

480

483

SUBMIT | CANCEL | VIEW CURRENT REMINDERS

REMIND ME EACH TIME:

FROM:      TO:
DATE: _____    DATE: _____
TIME: _____    TIME: _____

- - - - - - - - - - - - - - - - - 515

HOW SOON BEFORE EVENT DO YOU WANT TO BE REMINDED?

DAYS: _____
HOURS: _____
MINUTES: _____

| | ENTER | EXIT |

810 NEW REMINDERS

ENTER NAME:
ENTER E-MAIL ADDRESS:
ENTER PROGRAM TITLE:

813

HOW SOON BEFORE EVENT?:
○ 1 HOUR  ○ 2 DAYS
○ 1 DAY   ○ OTHER

818

REMIND ME:
○ THIS TIME ONLY    ○ EACH TIME THIS MONTH
○ EACH TIME THIS WEEK    ○ OTHER

824

830 SUBMIT

840 VIEW CURRENT REMINDERS 883

880 EXIT

FIG. 9

ORDER PPV MOVIE / EVENT

TO ORDER PPV ONLINE, YOU MUST HAVE HAVE A PIN NUMBER, IF YOU DO NOT HAVE A PIN NUMBER, PLEASE CALL CUSTOMER SERVICE AT 1-800-222-3333

ENTER TELEPHONE NUMBER
ENTER PIN

PLACE ORDER — 374

E-MAIL REMINDER — 377

TO: USER
SENT: FRI. NOVEMBER 21, 1997
RE: PREVUE ONLINE TV REMINDER

THANK YOU FOR VISITING PREVUE ONLINE!
    YOU HAVE SOME FAVORITE SHOWS THAT ARE COMING UP SOON:

CAST MEMBER PETA WILSON:
    SUNDAY
        9:00 PM USA(27)    LA FEMME NIKITA

CAST MEMBER TERRY FARREL:
    SATURDAY
        2:40 AM HBO(4)    RED SUN RISING

CAST MEMBER UMA:
    SUNDAY
        12:00 PM HBO(4)    THE TRUTH ABOUT CATS AND DOGS
                                  (FEATURING UMA THURMAN)

GENRE SCIENCE FICTION:
    FRIDAY
        5:00 PM SCI-FI(33)    SWAMP THING
        ⋮
        10:15 PM AMC(25)    FIVE MILLION YEARS TO EARTH
    SATURDAY
        4:00 AM SCI-FI(33)    RETRO TV
        ⋮
        11:35 PM KOTV(6)    STAR TREK: DEEP SPACE NINE
    SUNDAY
        12:35 AM KOTV(6)    PSI FACTOR
        ⋮
        1:00 PM KOTV(6)    THE ROCKETEER

ADD AN E-MAIL REMINDER GENRE

YOU WILL RECEIVE AN E-MAIL REMINDER FOR ALL SHOWS WITH THE PREVIOUS GENRE AIRING IN THE NEXT 48 HOURS (72 FROM FRIDAY).

| ACTION | | ADD |
| ACTION | | DELETE |

| GENRE |
|---|
| SCIENCE FICTION |
| MARTIAL ARTS |

E-MAIL REMINDERS WILL BE GENERATED FOR ALL PROGRAM'S
WITH YOUR FAVORITE ACTORS ON YOUR LOCAL SYSTEM. PREVUE FIRST
SCANS YOUR SYSTEM FOR THE NEXT 48 HOURS. ON FRIDAY'S WE
DO A 3 DAY SCAN SO YOU WON'T MISS ANY ACTION FOR THE
WEEKEND. DON'T FORGET TO PREVUE FIRST.

ACTOR: [                    ]

[ ADD ] [ DELETE ]

| FRANK'S FAVORITE ACTOR'S |
|---|
| UMA |
| BRIDGETT FONDA |
| PETA WILSON |

FIG. 14

E-MAIL REMINDERS WILL BE GENERATED FOR ALL TITLES THAT EXACTLY MATCH A PROGRAM ON YOUR LOCAL SYSTEM. PREVUE FIRST SCANS YOUR SYSTEM FOR THE NEXT 48 HOURS. ON FRIDAY'S WE DO A 3 DAY SCAN SO YOU WON'T MISS ANY ACTION FOR THE WEEKEND. DON'T FORGET TO PREVUE FIRST.

| EXACT TITLE: | |
|---|---|

[ ADD ]  [ DELETE ]

| FRANK'S FAVORITE EXACT TITLE |
|---|
| THE DAY OF THE JACKAL |

FIG. 15

E-MAIL REMINDERS WILL BE GENERATED FOR ALL TITLES THAT EXACTLY MATCH A PROGRAM ON YOUR LOCAL SYSTEM. PREVUE FIRST SCAN YOUR SYSTEM FOR THE NEXT 48 HOURS. ON FRIDAY'S WE DO A 3 DAY SCAN SO YOU WON'T MISS ANY ACTION FOR THE WEEKEND. DON'T FORGET TO PREVUE FIRST

| PARTIAL TITLE: | |
|---|---|

ADD    DELETE

| FRANK'S FAVORITE PARTIAL TITLE |
|---|
| SPACE |

*FIG. 16*

ELECTRONIC MAIL REMINDER FOR AN INTERNET TELEVISION PROGRAM GUIDE

This application is a continuation of U.S. patent application Ser. No. 08/987,740 filed Dec. 9, 1997 now abandoned, which is a continuation-in-part of U.S. patent application Ser. No. 08/938,028, filed Sep. 18, 1997 now abandoned, which are incorporated herein in their entireties.

BACKGROUND OF THE INVENTION

This invention relates to the Internet, and more particularly, to techniques for reminding a user via electronic mail (e-mail) of scheduled television programs displayed on an Internet television program guide.

Cable, satellite, and broadcast television systems provide viewers with a large number of television channels. Viewers have traditionally had to consult preprinted television program listings to determine which programs were scheduled to be broadcast on a particular day and at a particular time. Technological advances have allowed more convenient and advanced program guide services to be developed. For example, passive television-based program guides have been developed that allow television viewers to view television program listings directly on their television sets. In addition, interactive television program guide services have been developed that allow a service provider to deliver television program listings data to a user's set-top box. An interactive program guide application in the set-top box allows the user to display the television program listings on the user's television set. More recently, television program guide systems have been developed that provide television program listings over the Internet.

With such an Internet television program guide system, users with personal computers or integrated personal computers and televisions (PC/TVS) can obtain television program listings on-line. In addition, the users of Internet television program guides are able to view promotional video clips, interview segments, audio clips, and other multimedia material related to a given television program.

Although Internet television program guides provide users with a number of useful features, users are still faced with the problem of missing the television programs that they desire to watch because of not remembering when the program is to be broadcast on television. Users must often refer back to the program listings to determine when desired programs are to air.

It is therefore an object of the present invention to provide a way to remind users of Internet television program guides when certain television programs are to be aired.

SUMMARY OF THE INVENTION

This and other objects of the invention are accomplished in accordance with the principles of the present invention by providing an Internet television program guide electronic-mail (e-mail) reminder system. The system sends e-mail messages to users to remind the users when selected television programs are to be aired.

Television program information and related data for an Internet television program guide are provided to a web server from a computer system which may be maintained by a service provider. The web server provides this information to the user's multimedia system via an Internet communications link. The user's multimedia system may include a personal computer, an integrated personal computer and television, or an Internet capable set-top box and a television.

The program information and related data are preferably provided to the user's multimedia system in the form of one or more web pages. Program guide listings may be displayed in a grid format organized in channel order from top to bottom and by broadcast time from left to right. Web browser cursors allow the user to scroll through the listings to locate programs at different times in the day or different days in the month.

If a user selects a program or pay-per-view event from the program listings, additional information related to the program or event may be displayed in a program information box. In addition to viewing further information on the program selected, the user may order an e-mail reminder message to remind the user when the selected program will be broadcast. Options are provided that allow the user to determine when and how many messages will be generated and received. Before the scheduled broadcast time of each selected program, the system sends an e-mail message to the user that reminds the user of the program.

If desired, the user may order e-mail reminder messages without first viewing the program listings. This may be accomplished by directly entering the title of a television program for which reminders are to be ordered. This approach is useful when the user knows the program title and does not wish to consult the program listings or when the user knows the program title but does not know the location of the program in the program listings.

The user may also view a list of all currently requested e-mail reminders. Information such as the program name, type of e-mail reminder, and the date and time the request was submitted may be displayed on the list for each reminder. Entries may be added to the current reminder list as soon as the user submits a new request. In addition, the user may cancel reminder entries if the user no longer wishes to be reminded of that program.

In another aspect of the invention, e-mail reminder messages may be ordered and generated to remind a user when scheduled pay-per-view programs will be broadcast.

In yet another aspect of the invention, e-mail reminders may be ordered and generated based on other preferences which the user can specify.

Further features of the invention, its nature and various advantages will be more apparent from the accompanying drawings and the following detailed descriptions of the preferred embodiments.

BRIEF DESCRIPTION OF THE DRAWINGS

FIG. 3 is a diagram of an illustrative e-mail reminder page that allows a user to enter information for ordering e-mail reminders in accordance with the present invention.

FIG. 5 is a diagram of an illustrative e-mail reminder page that allows the user to enter more specific information for ordering e-mail reminders in accordance with the present invention.

FIG. 8 is a diagram of an illustrative e-mail reminder page that allows a user to enter a program title and to select among various options when ordering an e-mail reminder in accordance with the present invention.

FIG. 9 is a diagram of an illustrative web page that allows a user to order a pay-per-view event and an e-mail reminder in accordance with the present invention.

FIG. 12 is a diagram of an illustrative e-mail reminder message in accordance with the present invention.

FIG. 13 is a diagram of an illustrative e-mail reminder page that allows the user to specify various program genres when ordering an e-mail reminder in accordance with the present invention.

FIG. 14 is a diagram of an illustrative e-mail reminder page that allows the user to enter an actor when ordering an e-mail reminder in accordance with the present invention.

FIG. 15 is a diagram of an illustrative e-mail reminder page that allows the user to enter an exact title when ordering an e-mail reminder in accordance with the present invention.

FIG. 16 is a diagram of an illustrative e-mail reminder page that allows the user to enter a partial title when ordering an e-mail reminder in accordance with the present invention.

DETAILED DESCRIPTION OF THE PREFERRED EMBODIMENTS

Figure 1:
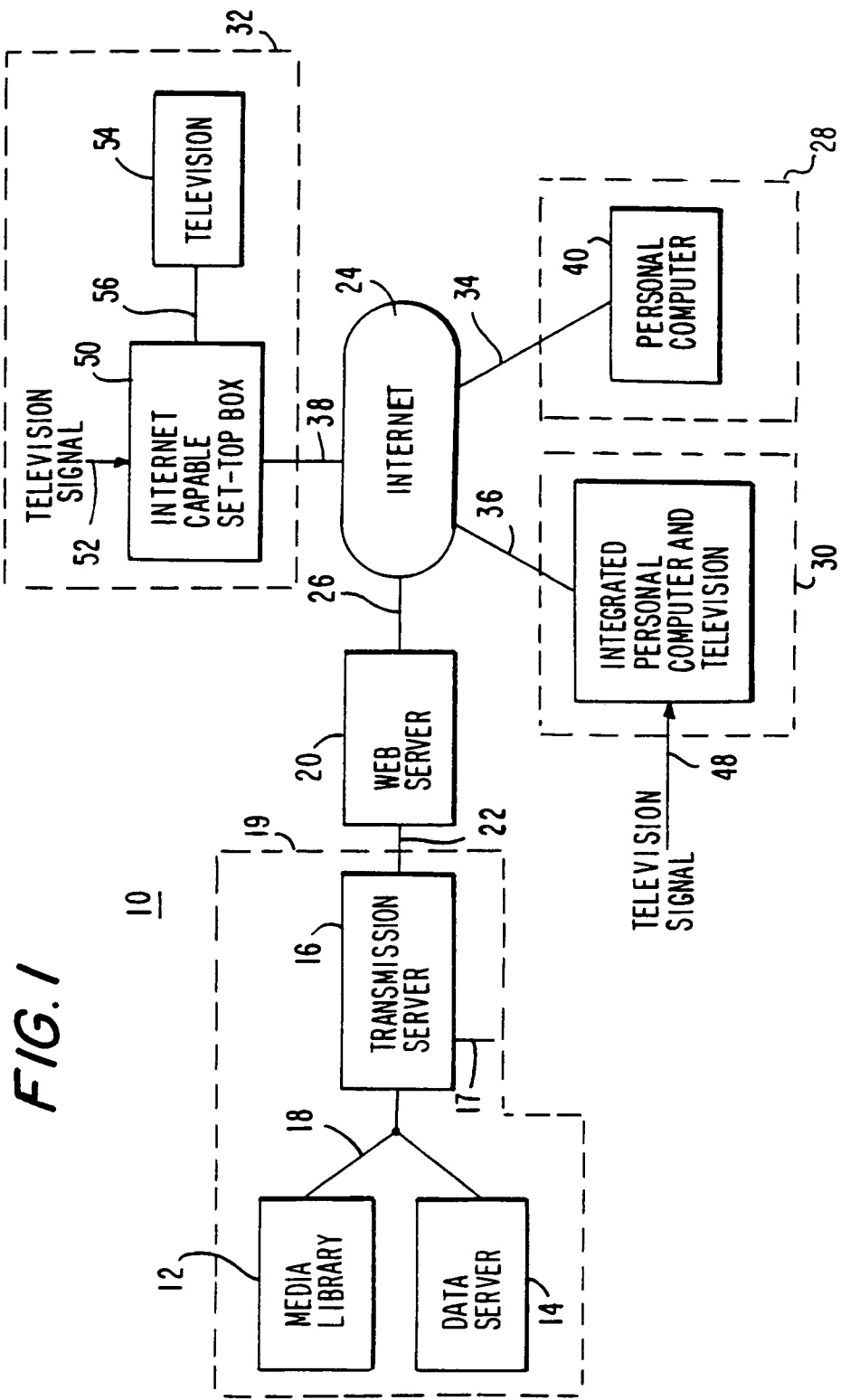
FIG. 1 is a diagram of an Internet television program guide system in accordance with the present invention.

An Internet television program guide system 10 in accordance with the present invention is shown in FIG. 1. Television program information is stored in media library 12 and data server 14. Media library 12 preferably contains an array of compact disc read only memory (CD-ROM) disks, digital video disks (DVDs), or other suitable media for storing multimedia content. Media library 12 contains television program clips and related interviews and reviews. The television program information stored in media library 12 is primarily video-based. Data server 14 maintains various databases of television program information. For example, data server 14 may have a remote media database containing descriptions of videos in media library 12. Data server 14 may also have a database containing information on standard titles, a pay per view database containing information regarding pay-per-view events, and a scheduling information database. Data server 14 may also have a cable system operator database containing channel lineups, information on the time zone of the operator, weather data for the operator's region, data on the zip codes in the cable system operator's area, etc. Other databases may be supported by data server 14, as desired. The television program information in data server 14 is primarily in non-video formats.

Media library 12 and data server 14 may be interconnected with transmission server 16 via internal network 18. Media library 12, data server 14, network 18, and transmission server 16 make up computer system 19. Television program information may be stored on data server 14 in a relational database format and may be stored on transmission server 16 in an object-oriented database format. A building process may be used to periodically (e.g., once a day) build a temporary data set of television program information (e.g., a seven-day to one-month data set) for storage on transmission server 16. Transmission server 16 may receive information for the Internet television program guide service such as weather data, sports scores, etc., via data input 17.

Television program information and related data may be transferred from transmission server 16 to web server 20 via communications link 22. Communications link 22 may be part of an internal network or may be a standard dedicated communications link. Web server 20 may be connected to the Internet 24 via communications link 26. Communications link 26 is preferably a telephone line or other suitable Internet communications path.

If transmission server 16 and web server 20 are separate devices, as shown in FIG. 1, transmission server 16 can be used as a common data processing facility for other applications which use the type of television program data stored on transmission server 16. If desired, the functions of transmission server 16 and web server 20 can be integrated in a single machine. The web server configuration of FIG. 1 is illustrative only. Any other suitable web server configuration may be used if desired. For example, web servers that are located at the facilities of able system operators may be used in conjunction with or instead of web servers such as web server 20.

Web server 20 uses standard protocols such as the TCP/IP (Transmission Control Protocol/Internet Protocol) and hypertext transfer protocol to make the television program information available over the Internet 24 to users at various multimedia systems such as multimedia systems 28, 30, and 32 via communications links 34, 36, and 38. Communications links 34, 36, and 38 are Internet links formed from telephone lines, radio-frequency (RF) links, cable modem links, satellite dish links, combinations of links such as these, or any other suitable Internet connection paths.

Multimedia system 28 has personal computer 40 with Internet access provided via Internet communications link 34.

Multimedia system 30 has an integrated personal computer and television 46, such as the Gateway 2000 Destination® PC-TV hybrid available from Gateway 2000 Inc. of North Sioux City, S. Dak. Television signals are provided at input 48. Internet access is provided via Internet communications link 36.

Multimedia system 32 has an Internet capable set-top box 50. Set-top box 50 may use the TV OnLine® set-top box application software of WorldGate Corporation, which may be implemented on set-top boxes such as the CFT-2200® of General Instrument Corporation of Hatboro, Pa. and the 8600x® of Scientific Atlanta of Atlanta, Ga. Set-top box 50 receives television signals via input 52. Internet access is provided via Internet communications link 38. Video display signals containing television and Internet information are provided to television 54 via path 56.

During operation of system 10, certain data processing functions, such as user-initiated searches and sorts, are typically performed on web server 20. If desired, such functions can be performed on a suitable data processing component in multimedia system 28, 30, or 32.

Figure 2:
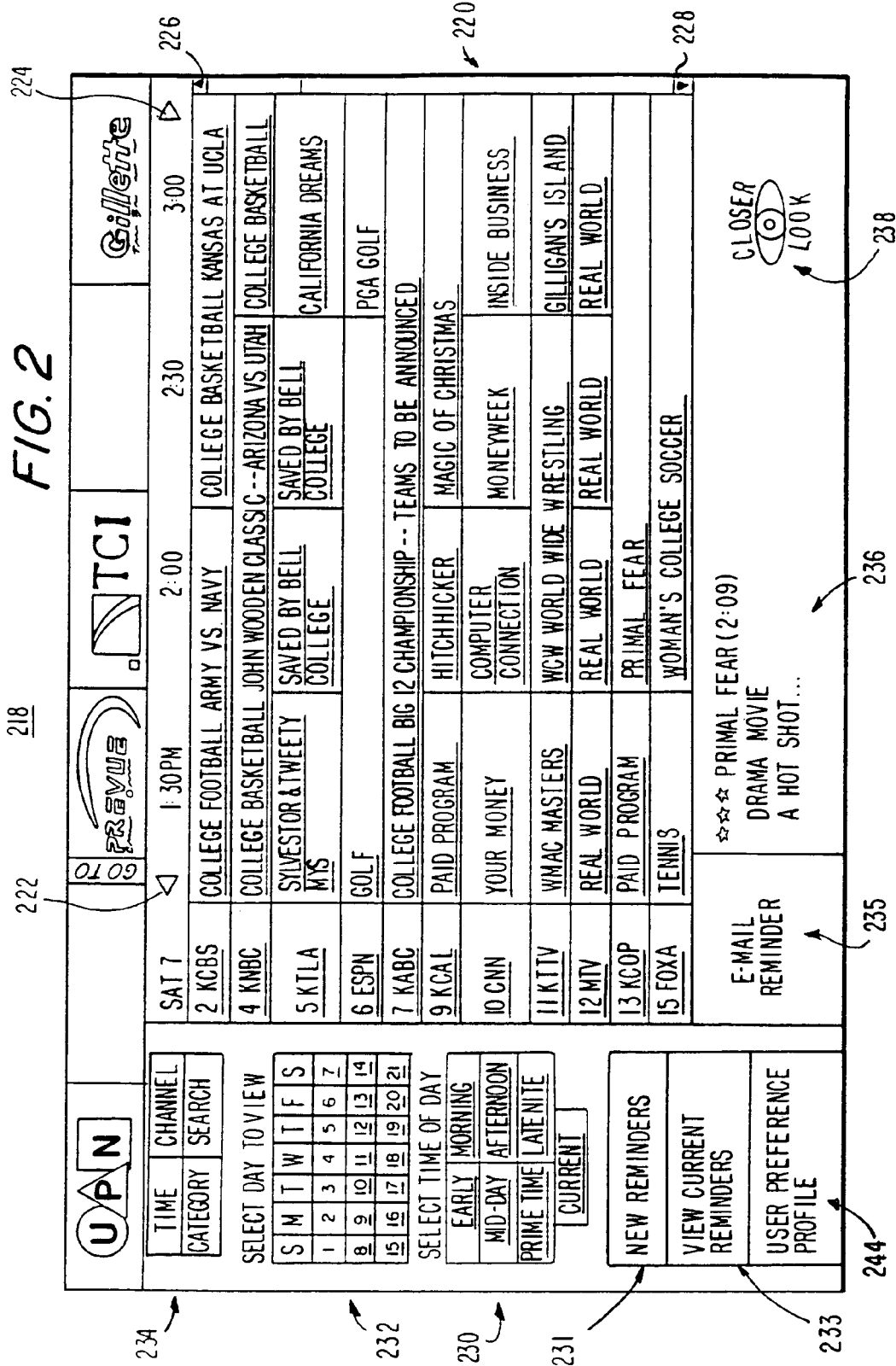
FIG. 2 is a diagram of an illustrative web page containing television program guide listings and e-mail reminder options in accordance with the present invention.

A typical Internet television program guide system display that may be provided using systems 28, 30, and 32 is shown in FIG. 2. Display 218 contains program listings 220 that are organized in channel order from top to bottom and by broadcast time from left to right. Cursors 222 and 224 may be used to navigate to earlier or later time-periods, respectively. Web browser cursors 226 and 228 allow the user to scroll through the program listings. The user may also navigate through the program listings with time navigation buttons 230 to view program listings for different times in the day. Calendar buttons 232 may be used to view program listings for different days in the month. The user can choose between various available view options by selecting a desired time, channel, category, or search button from among view buttons 234.

Figure 4:
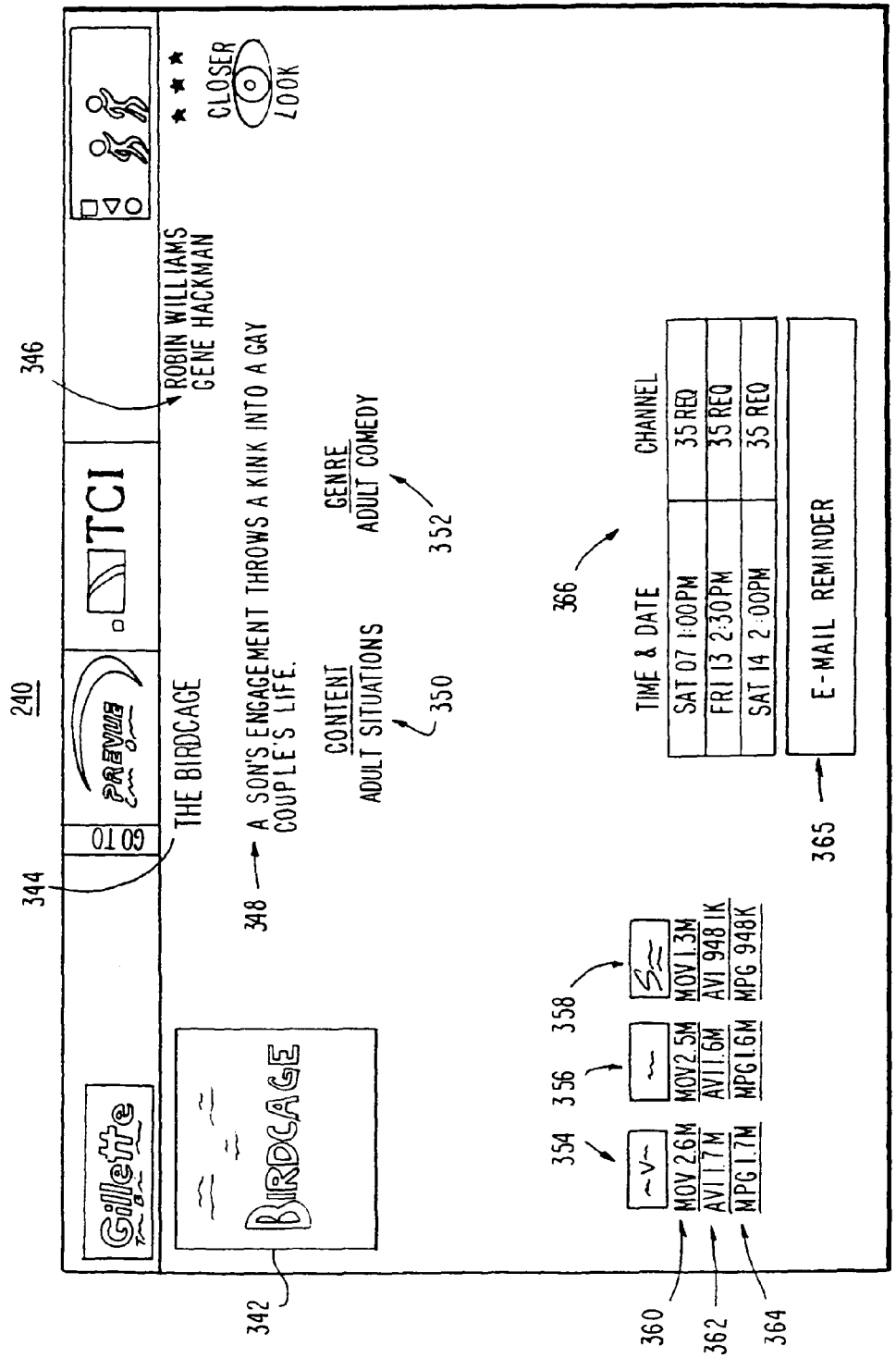
FIG. 4 is a diagram of an illustrative program information web page that contains information on a program selected by the user and that allows the user to order an e-mail reminder in accordance with the present invention.

Another component of display 218 is program information box 236. When the user has selected a program or pay-per-view event from program listings 220, additional information related to the program or event is displayed in program information box 236. For example, the user has clicked on the entry "Primal Fear" in program listings 220 of FIG. 2. As a result, the contents of program information box 236 reflects this selection. Program information box 236 typically contains the program title (e.g., Primal Fear), the running time of the program (e.g., 2:09), a brief description of the program (e.g., A hot shot . . . ), and a description of the program type or genre (e.g., drama movie). If the user desires to view additional information relating to the selected program, the user may click on "closer look" icon 238 (or alternatively, on any portion of box 236), which takes the user to program information page 240 (FIG. 4). Program information page 240 allows the user to obtain additional information such as video clips and interview segments on the selected program.

Another component of program information box 236 is e-mail reminder box 235. This box is displayed concurrently with program information box 236 whenever the user has selected a program or event from program listings 220. If e-mail reminder box 235 is selected, the user is presented with an e-mail reminder page such as e-mail reminder page 410 of FIG. 3. E-mail reminder page 410 contains user-selectable options that the user may complete when ordering an e-mail reminder message to remind the user when a particular television program is to be broadcast. As defined herein, such uses of the term "broadcast" refer to the process of airing television programs by traditional television broadcast techniques, cable systems, or satellite systems.

Fields 414 and 418 of e-mail reminder page 410 allows the user to enter the name and e-mail address, respectively, of the person the e-mail reminder message is to be sent to. If desired, the user's name and e-mail address may be automatically entered in fields 414 and 418 based on information previously provided to the system (e.g., information provided when the user registered with the Internet television program guide service).

If the user is browsing program listings from a computer located at the user's office, the user may wish to have e-mail reminders addressed to his home (i.e., using his personal Internet access account and the e-mail address for the multimedia system at home). Alternatively, the user may wish to have e-mail reminders sent to an office e-mail address. If the user has a common e-mail address for both home and the office, e-mail reminders may be accessed at either location. If desired, the system may provide more than one field 418 (e.g., field 421) so that e-mail reminders may be sent to more than one e-mail address.

E-mail reminder page 410 may provide several user-selectable options that specify when and how often the user will be reminded of the airing of selected television programs. For example, e-mail reminder page 410 may contain remind me box 424. Selecting an option in remind me box 424 allows the user to specify how often the system will generate and send a reminder message for the user. As shown in FIG. 3, the options in remind me box 424 may allow the user to be reminded of the selected program only once, each time the program is broadcast in a week, each time the program is broadcast in a month, or at some other specified time. If "other" in remind me box 424 is selected, the user is presented with page 510 shown in FIG. 5. Page 510 allows the user to specify the time period during which reminder messages will be generated and sent. The user may specify a time period by completing box 513.

E-mail reminder page 410 of FIG. 3 may also contain how soon box 430. Selecting an option in box 430 allows the user to indicate how soon before the broadcast of the scheduled program reminder messages are to be generated and sent to the user. As shown in FIG. 3, box 430 may contain options that allow the user to be reminded 1 hour, 1 day, 2 days, or another amount of time before the selected program is broadcast. If "other" is selected in box 430, the user is presented with page 510 of FIG. 5, which allows the user to specify a desired lead time before a scheduled event by completing box 515.

Upon completing page 510 of FIG. 5, the user may submit the information that has been entered by selecting enter button 517. The user may exit page 510 without submitting the information by selecting exit button 519. If the user selects either enter button 517 or exit button 519, the user is returned to e-mail reminder page 410.

The options the user selects in boxes 424 and 430 of page 410 determine, respectively, how often and when e-mail reminder messages will be sent. For example, a user may select a program from program listings 220 (FIG. 2) that will be broadcast five times during the upcoming week. When the user selects e-mail reminder box 235 of FIG. 2, the user is then presented with e-mail reminder page 410 of FIG. 3. If the user selects the "1 hour" option in box 430 and the "each time this week" option in remind me box 424, the user will receive five e-mail reminder messages (assuming fields 414 and 418 are completed with the user's own information) 1 hour before each broadcast of the program during that week. The messages may be sent from web server 20 to the user's multimedia system using standard e-mail techniques.

At any time during the completion of e-mail reminder screen 410 (FIG. 3), the user may cancel the e-mail reminder order by selecting cancel box 480. Selecting cancel box 480 returns the user to display 218 of FIG. 2.

Upon completing reminder screen 410, the user may submit a reminder order for processing by selecting submit box 440. Selecting submit box 440 directs the user's multimedia system 28, 30, or 32 of FIG. 1 to send the order to web server 20 (or another such suitable web server) via communications links 34, 36, or 38, Internet 24, and communications link 26. The order is processed and a reminder message is generated by web server 20 and transmitted to the user's multimedia system by e-mail at the appropriate time. Depending on the television program and user-selectable options selected, the user may request and receive one or more e-mail reminder messages.

Figure 6:
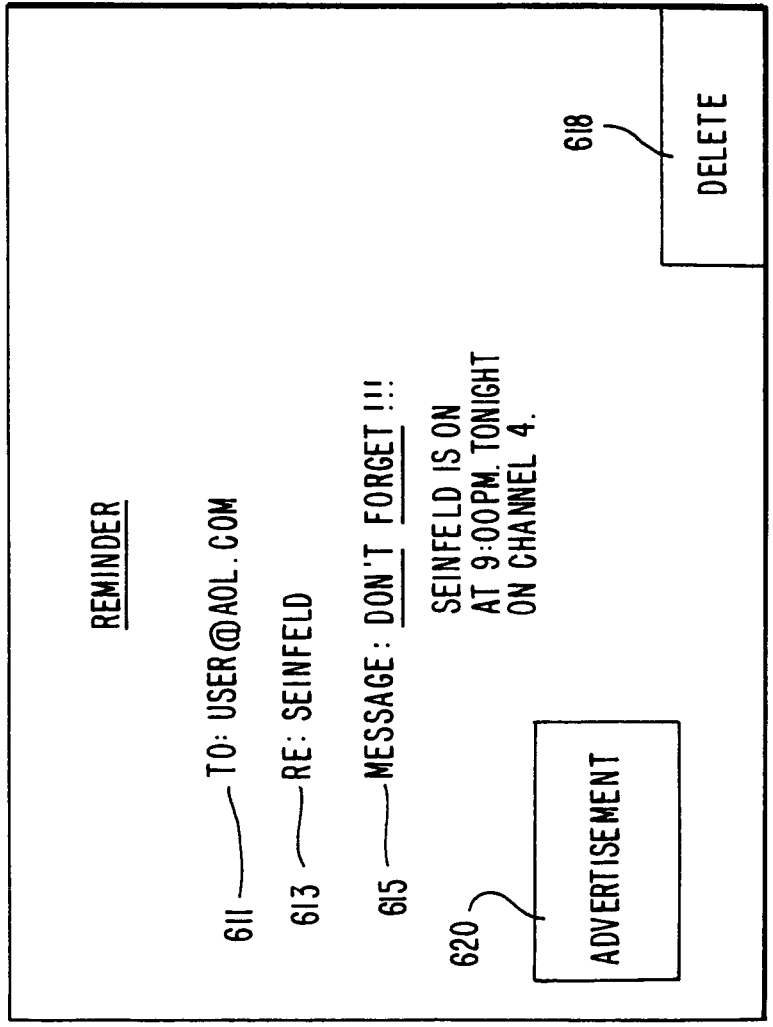
FIG. 6 is a diagram of an illustrative e-mail reminder message in accordance with the present invention.

A typical e-mail reminder message is shown in FIG. 6. The message may display the e-mail address of the person the message is being sent to (611), the name of the television program that the person is being reminded of (613), and a reminder message indicating "DON'T FORGET" along with information on when the television program is to broadcast (615). The user may delete the message by selecting delete button 618. An advertisement 620 (text, graphics, etc.) may be included in or attached to the reminder message if desired. The advertisement may be provided using information stored in computer system 19.

Another aspect of the invention relates to managing one's reminders. If desired, e-mail reminder page 410 of FIG. 3 may contain view current reminders box 483. If view current reminders box 483 is selected, the user may be presented with current reminders page 710 of FIG. 7. Current reminders page 710 contains a list of all the user's currently requested e-mail reminders. Information such as the program name, type of e-mail reminder, and the date and time submitted may be displayed.

Figure 7:
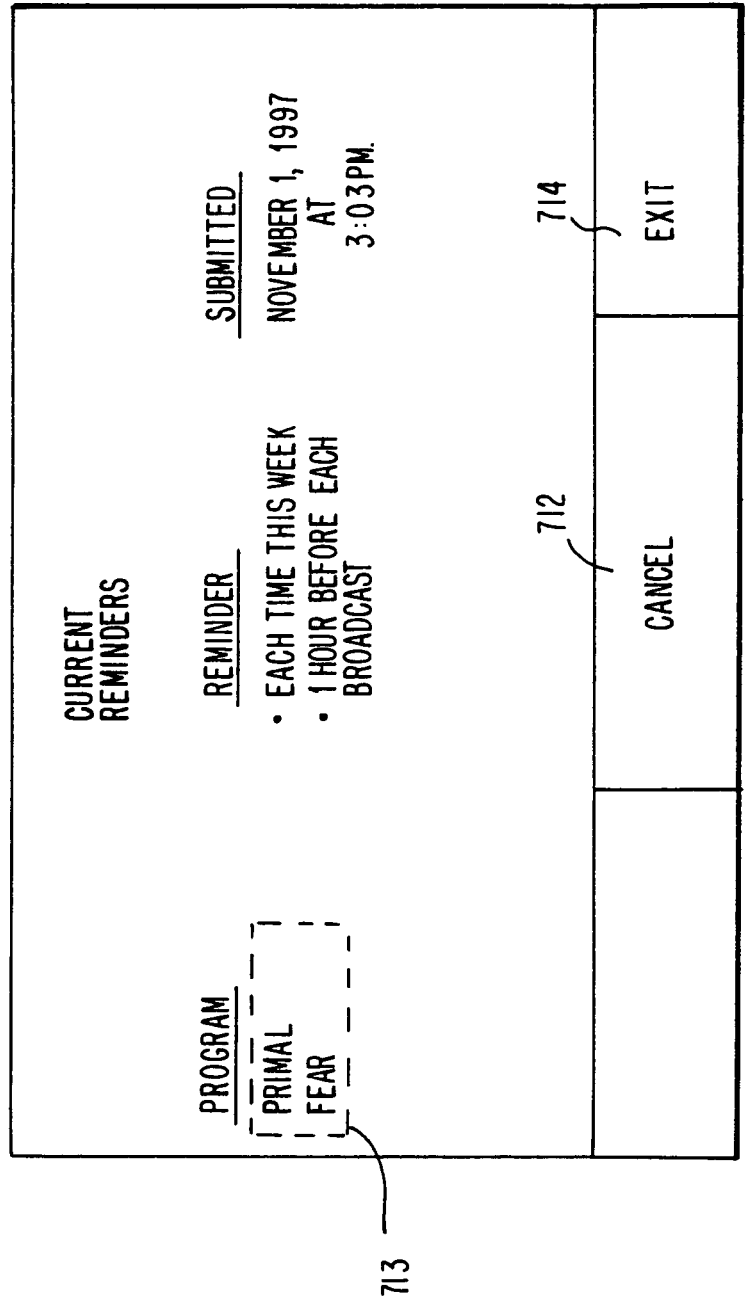
FIG. 7 is a diagram of an illustrative e-mail reminder page listing all current e-mail reminder orders in accordance with the present invention.

For example, a current reminder entry for the program "Primal Fear" may be displayed as shown in FIG. 7. This reminder was submitted by the user on Nov. 1, 1997 at 3:03 p.m. and is set to remind the user one hour before each broadcast during the week beginning Nov. 1, 1997. Entries may be added to the current reminder list as soon as the user submits each request (e.g., by clicking on submit button 440 from e-mail reminder page 410 of FIG. 3). If the user wishes to cancel a current reminder that the user has previously ordered, the user may highlight the desired entry on the screen with highlight region 713 and click on cancel button 712. After clicking on cancel button 712, the highlighted entry is deleted from the current reminder list and the user will no longer be reminded of the broadcasts of that program. The user may return to page 410 by clicking on exit button 714.

Another way that the user may reach e-mail reminder page 410 of FIG. 3 is by clicking on e-mail reminder button 365 in program information page 240 of FIG. 4. Another way that the user may reach current reminders page 710 of FIG. 7 is by clicking on view current reminders button 233 in display 218 of FIG. 2.

Another component of display 218 is new reminders box 231. New reminders box 231, which may be adjacent to the program navigation controls of display 218, allows the user to order e-mail reminder messages without using program listings 220. If new reminders box 231 is selected, the user is presented with new reminders page 810 of FIG. 8. New reminders page 810 contains user-selectable options similar to the options contained in e-mail reminder page 410 of FIG. 3. For example, new reminders page 810 contains a user information box 813, a how soon box 830, and a remind me box 824. However, new reminders page 810, allows the user to enter the title of a television program for which reminders are to be ordered directly in box 818 without searching program listings 220. This is useful when the user knows the program title and does not wish to consult program listings 220 or when the user knows the program title but not know the location of the program in program listings 220.

If the user does not enter the exact title of the television program in new reminders screen 810, the data of program listings 220 or any other suitable set of television program listings data may be scanned to find the program or programs that most closely match the program title indicated by the user. If several matches are found, a list of the program matches may be presented to the user and the user may choose the actual program desired. Once the user has chosen a program from the list, the program title in box 818 may be automatically updated.

The user may exit new reminders screen 810 at any time by clicking on exit button 880. Selecting exit button 880 will return the user to display 218 of FIG. 2.

Upon completing new reminders screen 810, the user may submit the reminder order for processing by selecting submit box 840. Selecting submit box 840 allows program guide system 10 (FIG. 1) to process the request. The request may be processed in the same way a reminder request may be processed when ordered from reminder screen 410 of FIG. 3.

The user may reach current reminders page 710 of FIG. 7 from new reminders page 810 of FIG. 8 by clicking on view current reminders button 883.

E-mail reminder messages may also be ordered and generated to remind the user of when scheduled pay-per-view programs will be broadcast. Program information page 240 of FIG. 4 contains information related to the program selected by the user on previous pages. For example, if the user has selected a pay-per-view event from program listings 220 and then selects the closer look icon 238, program information page 240 will contain more information relating to that pay-per-view event.

Program information page 240 of FIG. 4 contains program listings 366, which provide title, channel, and time and date information for the selected program. If the user has selected a pay-per-view event in order to arrive at program information page 240, program listings 366 displays additional broadcast information for that pay-per-view program. When the user clicks on a pay-per-view entry in program listings 366, the user is taken to order page 336 (FIG. 9).

As shown in FIG. 9, order page 336 contains instructions 368 on how to order a pay-per-view event Order page 336 also contains telephone number query box 370 and personal identification number box 372. The user may place an order for a pay-per-view event by clicking on place order button 374. Information entered by the user into boxes 370 and 372 may be used to verify the user's identity and account status. Once the user's information has been verified, the selected pay-per-view event may be delivered to the user's multimedia system.

The user may request an e-mail reminder message for the selected pay-per-view event by clicking on e-mail reminder button 377. When the user selects e-mail reminder button 377, the user is presented with e-mail reminder screen 410 of FIG. 3. After the user has completed e-mail reminder screen 410, the user may click on submit button 440 to process the request.

The way in which pay-per-view event orders are processed depends on the particular hardware used to deliver such services to the user. In system 10 of FIG. 1, web servers such as web server 20 may be located at cable system headends to receive and process pay-per-view orders submitted using order pages such as order page 336. After processing an order, the web server can direct conventional pay-per-view equipment at the cable system headend to authorize the display of the ordered pay-per-view event using set-top box 50 or a similar integrated component. Selecting pay-per-view e-mail reminder button 377 directs user's multimedia system 32 of FIG. 1 (or a similar set-top box based system) to send the order to the Internet 24 via communications link 38. The order is then transmitted to web server 20 via communications link 26. The order may be processed and the reminder message generated by web server 20, then transmitted to the user's multimedia system 32 by e-mail. Depending on the pay-per-view event and user-selectable options selected, the user may request and receive one or more such e-mail reminder messages for pay-per-view events.

If program information page 240 of FIG. 4 details a pay-per-view event, a pay-per-view e-mail reminder message may be ordered from program information page 240 by selecting e-mail reminder button 365 (FIG. 4). Selecting e-mail reminder button 365 will again take the user to e-mail reminder page 410 of FIG. 3. There the user may place an e-mail reminder order using the same steps used for a non pay-per-view television program reminder request.

Figure 10:
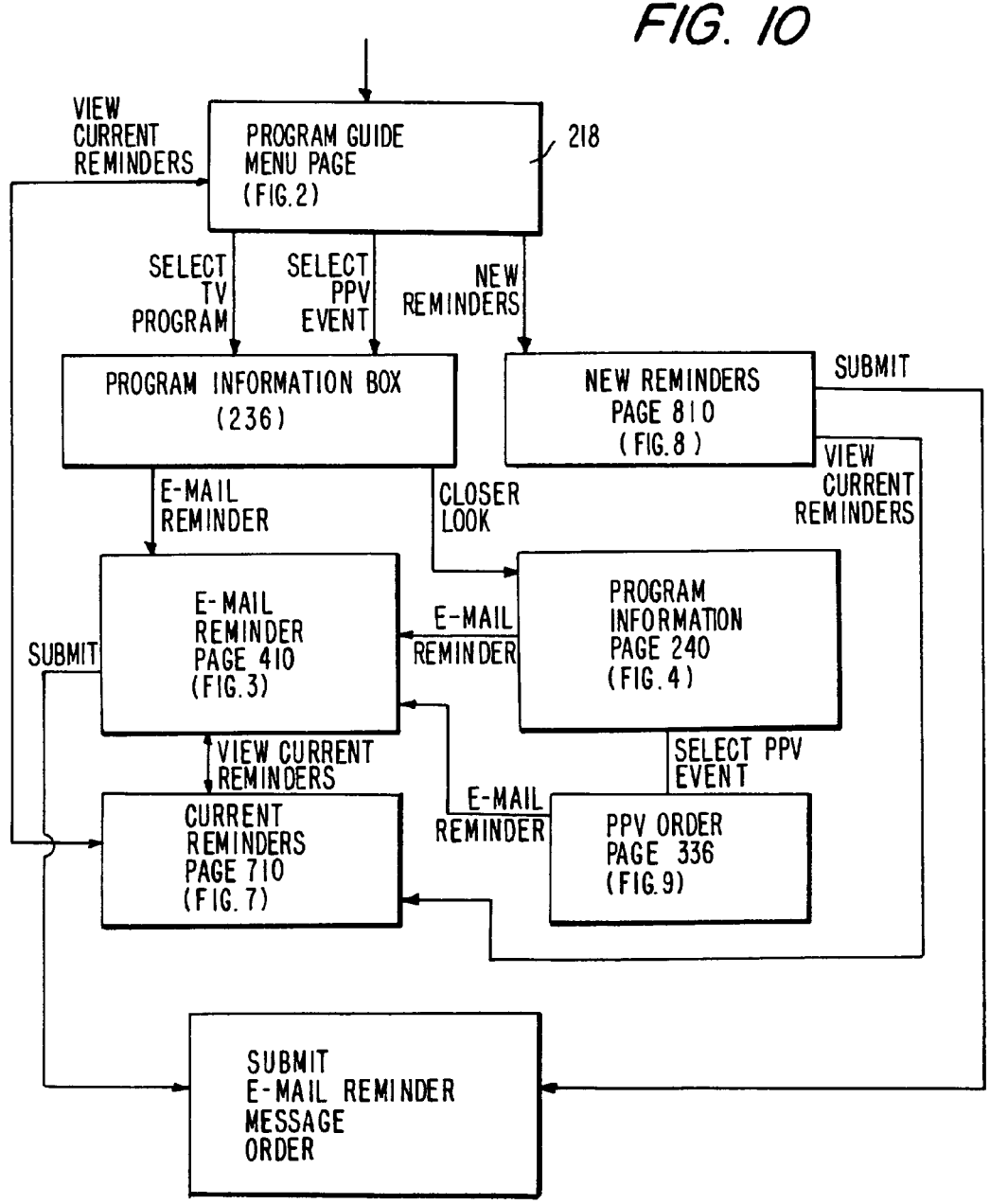
FIG. 10 is a site map showing options that may be selected when ordering e-mail reminder messages via an Internet television program guide in accordance with the present invention.

FIG. 10 is a site map showing the interrelationship of the web pages used to provide the features of the e-mail message program reminder service. The service can initially be accessed from the program guide menu page 218 (FIG. 2). When the user selects a scheduled television program, program information box 236 displays information on the selected item and displays e-mail reminder button 235. Similarly, when the user selects a scheduled pay-per-view event, program information box 236 displays information on the selected pay-per-view event and displays e-mail reminder button 235. Selecting the e-mail reminder button from program guide menu page 218 takes the user to e-mail reminder page 410 (FIG. 3). The user, by selecting closer look icon 238 from box 236, is presented with program information page 240 (FIG. 4) which displays further information on the scheduled program or pay-per-view event. The user may also reach e-mail reminder page 410 from page 240 by selecting e-mail reminder button 365.

The user may also access e-mail reminder page 410 and order an e-mail pay-per-view event reminder by selecting e-mail reminder button 377 from pay-per-view order page 336 (FIG. 9). Pay-per-view order page 336 may be accessed from program information page 240.

E-mail reminder page 410 allows the user to submit an e-mail reminder order as well as specify the type of message desired (i.e., when and how many messages are to be sent). The user may submit an e-mail reminder order by selecting submit button 440 (FIG. 3). Once the user submits a reminder order (shown as step 890 in FIG. 10), the reminder is added to current reminders page 710 of FIG. 7. The user may also be taken to current reminders page 710 by selecting view current reminders button 483 (FIG. 3). While at current reminders page 710, the user may view all current reminders and may delete any reminder which is no longer desired. The user may also access current reminders page 710 from program guide menu page 218 by selecting view current reminders button 233 (FIG. 2).

When the user is at program guide menu page 218, selecting new reminders button 231 takes the user to new reminders page 810 (FIG. 8). While at new reminders page 810, the user may enter the desired program title directly by completing field 818. The user may, by selecting view current reminders button 883 (FIG. 8), access current reminders page 710 or submit an order by selecting submit button 840 (FIG. 8).

Figure 11:
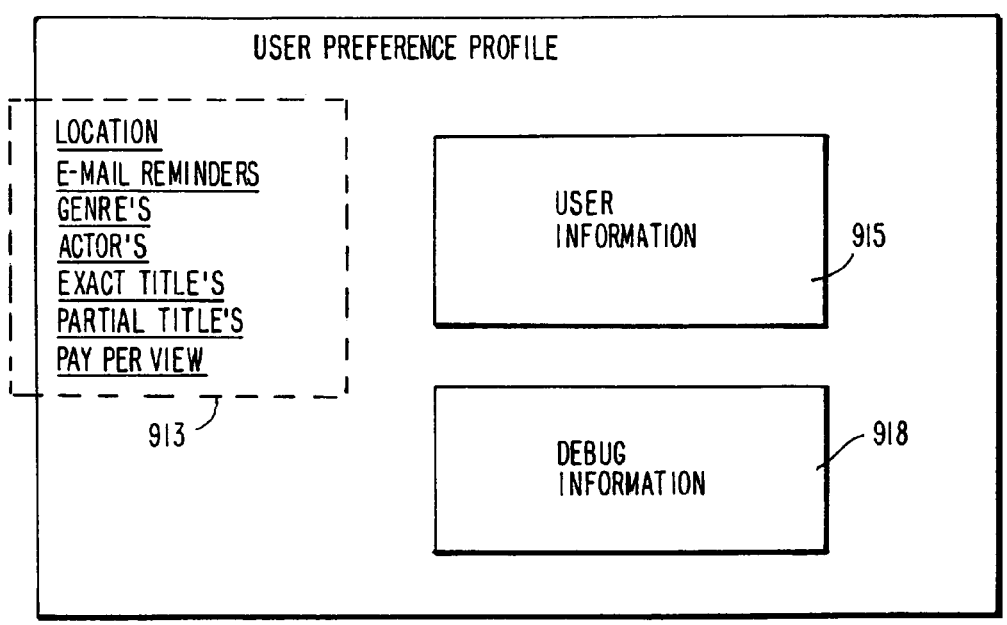
FIG. 11 is a diagram of an illustrative web page that allows a user to select among various preferences when ordering an e-mail reminder in accordance with the present invention.

In another aspect of the invention, the user may enter other e-mail reminder preferences by clicking on user preference profile button 244, as shown in FIG. 2. If user preference profile button 244 is selected, the user is presented with user preference profile page 910 of FIG. 11. User preference profile page 910 may contain clickable options 913 allowing the user to further customize e-mail reminder messages that are generated and received. This allows the user to order e-mail reminder messages without using program listings 220 of FIG. 2. For example, if the user clicks on "Genre's" from clickable options 913, the user may be presented with web page 950 of FIG. 13. Web page 950 allows the user to specify a particular genre of television programs for which reminders are to be ordered. The data of program listings 220 or any other suitable set of television program listings data may then be scanned to find the programs having that genre. Similarly, the user may click on "Actor's", "Exact Title's", or "Partial Titles" from clickable options 913 whereby the user may be presented with web pages shown in FIGS. 14, 15, and 16, respectively. The user may specify additional preferences to further customize the e-mail reminder message that is generated and received. Also the user may specify a lead time and time period during which reminder messages will be generated and received.

A typical customized e-mail reminder message is shown in FIG. 12. The message may display television programs having the user preferences specified via user preference profile page 910.

In addition, the user may receive the information displayed in the customized e-mail reminder message of FIG. 12 without having to actually receive an e-mail message or actively browse the Internet. The user may (e.g., through an Internet active channel) subscribe to a service that allows the user to receive the customized reminder information and have it available on the user's multimedia system based on user information 915 and debug information 918 of FIG. 11. The user may also request that the reminder information be updated and sent to the user periodically.

The foregoing is merely illustrative of the principles of this invention and various modifications can be made by those skilled in the art without departing from the scope and spirit of the invention.

What is claimed is:

1. An Internet e-mail reminder system for transmitting e-mail reminder messages of media events over the Internet comprising:
   a web server for transmitting web pages of media asset identifiers over the Internet, wherein the web server is configured to:
   receive a user selection of a media asset from the web pages of media asset identifiers;
   receive an order of at least one e-mail reminder message for the media asset;
   receive a user selection of a selectable e-mail reminder management option;
   generate for display an identifier associated with the at least one e-mail reminder message, wherein the identifier associated with the at least one e-mail reminder message is displayed in an e-mail reminder management web page in response to receipt of the user selection of the selectable e-mail reminder management option, and wherein the e-mail reminder management web page includes at least one selectable option comprising at least one of:
   a how soon option for determining how soon to send the at least one e-mail reminder message to a user equipment device relative to the time that the media asset is to begin, and
   a how often option for determining how often the at least one e-mail reminder message is to be generated and sent to the user equipment device;
   in response to user input, modify an attribute of the at least one e-mail reminder message without modifying when the media asset is to begin; and
   automatically generate and transmit over the Internet the at least one e-mail reminder message to the user equipment device according to the modified attribute of the at least one e-mail reminder message to remind a user when the media asset is to begin.

2. The system defined in claim 1, wherein the web pages of media asset identifiers include at least one of:
   a selectable view current e-mail reminders option for receiving a list of current e-mail reminder orders; and
   a selectable new e-mail reminders option for ordering another e-mail reminder message by entering a media asset title.

3. The system defined in claim 2 wherein, when the new e-mail reminders option is selected, a new e-mail reminders web page is transmitted, and wherein the web server receives e-mail address designations for a plurality of destinations to which the at least one e-mail reminder message is to be sent via the new e-mail reminders web page.

4. The system defined in claim 1, wherein the web server is further configured to transmit a pay-per-view order web page which includes an e-mail reminder option for ordering another e-mail reminder message.

5. The system defined in claim 1, wherein the web pages include a user preference profile option for ordering another e-mail reminder message by selecting from various e-mail reminder preferences.

6. The system defined in claim 5, wherein the user preference profile option includes at least one selectable option.

7. The system defined in claim 6, wherein the at least one selectable option comprises a genre option for ordering the another e-mail reminder message by entering at least one of a media asset genre, an actor's name, a complete media asset title, or a partial media asset title.

8. The system defined in claim 1, wherein, when the selectable e-mail reminder option is selected, the e-mail reminder web page is transmitted, and wherein the web server receives e-mail address designations for a plurality of destinations to which the at least one e-mail reminder message is to be sent via the e-mail reminder web page.

9. The system defined in claim 1, wherein the web server is further configured to:
    receive a user selection of a selectable attribute option;
    receive a user input of a keyword related to the selected attribute option;
    automatically search for a searchable media asset relating to both the keyword and the selected attribute option;
    automatically generate an order of at least one e-mail reminder message for the searchable media asset when a matching media asset is found as a result of the search; and
    automatically generate and transmit the at least one e-mail reminder message for the searchable media asset to the user via e-mail over the Internet to remind the user when the matching media asset is to begin.

10. The system of claim 9, wherein the search is automatically repeated at a predetermined time.

11. The system of claim 9, wherein the search is performed periodically.

12. The system of claim 9, wherein the selectable attribute option corresponds to at least one of a media asset genre, an actor's name, a complete media asset title, or a partial media asset title.

13. A method for transmitting e-mail reminder messages of media events over the Internet, the method comprising:
    transmitting web pages of media asset identifiers over the Internet;
    receiving a user selection of a media asset from the web pages of media asset identifiers;
    receiving an order of at least one e-mail reminder message for the media asset;
    receiving a user selection of a selectable e-mail reminder management option;
    generating for display an identifier associated with the at least one e-mail reminder message, wherein the identifier associated with the at least one e-mail reminder message is displayed in an e-mail reminder management web page in response to receipt of the user selection of the selectable e-mail reminder management option, and wherein the e-mail reminder management web page includes at least one selectable option comprising at least one of:
        a how soon option for determining how soon to send the at least one e-mail reminder message to a user equipment device relative to the time that the media asset is to begin, and
        a how often option for determining how often the at least one e-mail reminder message is to be generated and sent to the user equipment device;
    in response to user input, modifying an attribute of the at least one e-mail reminder message without modifying when the media asset is to begin; and
    automatically generating and transmitting the at least one e-mail reminder message over the Internet to the user equipment device according to the modified attribute of the at least one e-mail reminder message to remind a user when the media asset is to begin.

14. The method defined in claim 13, further comprising at least one of:
    a selectable view current e-mail reminders option for receiving a list of current e-mail reminder orders; and
    a selectable new e-mail reminders option for ordering an e-mail reminder message by entering a media asset title.

15. The method defined in claim 14 further comprising receiving, through a new e-mail reminders web page associated with the new e-mail reminders option, e-mail address designations of a plurality of destinations to which the at least one e-mail reminder message is to be sent.

16. The method defined in claim 13, further comprising transmitting a pay-per-view order web page which includes an e-mail reminder option for ordering an associated e-mail reminder message.

17. The method defined in claim 13, wherein the web pages further comprise a user preference profile option for ordering another e-mail reminder message by selecting from various e-mail reminder preferences.

18. The method defined in claim 17, wherein the user preference profile option further comprises at least one selectable option.

19. The method defined in claim 18, wherein the at least one selectable option comprises a genre option which the user selects to order the another e-mail reminder message by entering a media asset genre, an actor's name, an exact media asset title, or a partial media asset title.

20. The method defined in claim 13 further comprising receiving, through the e-mail reminder web page associated with the selectable e-mail reminder option, e-mail address designations of a plurality of destinations to which the at least one e-mail reminder message is to be sent.

21. The method defined in claim 13, further comprising:
    receiving a user selection of a selectable attribute option;
    receiving a user input of a keyword related to the selected attribute option;
    automatically searching for a searchable media asset relating to both the keyword and the selected attribute option;
    automatically generating an order of at least one e-mail reminder message for the searchable media asset when a matching media asset is found as a result of the search; and
    automatically generating and transmitting the at least one e-mail reminder message for the searchable media asset to the user via e-mail over the Internet to remind the user when the matching media asset is to begin.

22. The method of claim 21, wherein the searching is automatically repeated at a predetermined time.

23. The method of claim 21, wherein the searching is performed periodically.

24. The method of claim 21, wherein the selectable attribute option corresponds to at least one of a media asset genre, an actor's name, a complete media asset title, or a partial media asset title.

* * * * *

UNITED STATES PATENT AND TRADEMARK OFFICE
CERTIFICATE OF CORRECTION

PATENT NO.         : 8,762,492 B2
APPLICATION NO.    : 10/933689
DATED              : June 24, 2014
INVENTOR(S)        : Boyer et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1594 days.

Signed and Sealed this
Thirteenth Day of October, 2015

Michelle K. Lee
*Director of the United States Patent and Trademark Office*